(12) United States Patent  
Garrison

(10) Patent No.: US 8,408,555 B2
(45) Date of Patent: Apr. 2, 2013

(54) INTERSHAFT SEAL SYSTEM FOR MINIMIZING PRESSURE INDUCED TWIST

(75) Inventor: Glenn M. Garrison, Perkiomenville, PA (US)

(73) Assignee: Stein Seal Company, Kulpsville, PA (US)

( * ) Notice: Subject to any disclaimer, the term of this patent is extended or adjusted under 35 U.S.C. 154(b) by 0 days.

(21) Appl. No.: 13/504,302

(22) PCT Filed: Sep. 16, 2010

(86) PCT No.: PCT/US2010/049030
§ 371 (c)(1),
(2), (4) Date: Apr. 26, 2012

(87) PCT Pub. No.: WO2012/036684
PCT Pub. Date: Mar. 22, 2012

(65) Prior Publication Data
US 2012/0217703 A1 Aug. 30, 2012

(51) Int. Cl.
*F16J 15/34* (2006.01)
(52) U.S. Cl. ......... 277/306; 277/370; 277/401; 277/408
(58) Field of Classification Search ............ 277/306, 277/370, 399, 400, 401, 408
See application file for complete search history.

(56) References Cited

U.S. PATENT DOCUMENTS

| 3,751,045 | A |   | 8/1973 | Lindeboom |
| 3,813,103 | A | * | 5/1974 | Wiese ............................ 277/401 |
| 4,071,253 | A | * | 1/1978 | Heinen et al. ................. 277/369 |
| 4,972,986 | A |   | 11/1990 | Lipschitz |
| 6,196,790 | B1 |   | 3/2001 | Sheridan et al. |
| 6,726,213 | B2 | * | 4/2004 | Wang ............................ 277/400 |
| 7,044,470 | B2 |   | 5/2006 | Zheng |

FOREIGN PATENT DOCUMENTS

| JP | 2008-038989 A | 2/2008 |
| WO | WO 97-25543 A1 | 7/1997 |
| WO | WO 2010-076641 A1 | 7/2010 |

* cited by examiner

*Primary Examiner* — Vishal Patel
(74) *Attorney, Agent, or Firm* — Michael Crilly, Esq.

(57) ABSTRACT

An intershaft seal system capable of communicating a balanced pressure profile onto forward and aft faces along a piston ring is presented. Seal system includes forward and aft mating rings and a piston ring. Mating rings include a plurality of divergent flow grooves adjacent to the piston ring. Each divergent flow groove includes a pair of grooves which intersect at and are substantially symmetric about an apex. The piston ring includes channels which direct a fluid from a high pressure region upward, downward, or directly through the piston ring and onto the divergent flow grooves. The divergent flow grooves separate the fluid in a symmetrically divergent fashion prior to communication onto the piston ring. The divergent flow grooves communicate a substantially symmetric pressure force along the radial width of the piston ring so as to minimize twisting thereof, thus reducing wear along the piston ring and increasing seal life.

15 Claims, 19 Drawing Sheets

INTERSHAFT SEAL SYSTEM FOR MINIMIZING PRESSURE INDUCED TWIST

CROSS REFERENCE TO RELATED APPLICATIONS

This application is based upon and claims priority from Patent Cooperation Treaty Application No. PCT/US2010/049030 filed Sep. 16, 2010, entitled Intershaft Seal System for Minimizing Pressure Induced Twist, which is hereby incorporated in its entirety by reference thereto.

FEDERALLY SPONSORED RESEARCH AND DEVELOPMENT

None.

BACKGROUND OF THE INVENTION

1. Field of the Invention

The invention generally relates to a seal for use within an intershaft assembly. Specifically, the invention is a sealing system including divergent flow grooves which separate fluid, originating from a high pressure region, communicated onto each apex along the divergent flow grooves so as to produce a balanced pressure profile radially widthwise across a piston ring disposed between concentric, rotatable inner and outer shafts. The divergent flow grooves minimize twisting along a piston ring otherwise produced by conventional hydrodynamic grooves along a mating ring. The invention is applicable to a variety of uses wherein concentric shafts are disposed in a co-rotating or counter-rotating arrangement, one specific non-limiting example being a turbine engine.

2. Background

Intershaft seal systems and hydrodynamic grooves are both known within the seal art.

Lipschitz describes a circumferential inter-seal for sealing between relatively rotatable concentric shafts in U.S. Pat. No. 4,972,986. With reference to FIG. 1, the intershaft seal assembly 1 includes a forward mating ring 4 adjacent to a high pressure region and an aft mating ring 5 adjacent to a low pressure region. Mating rings 4, 5 are disposed about a seal ring 6. A spacer ring 8 is concentrically aligned with the seal ring 6 and separated therefrom via an annular space 10. The spacer ring 8 is wider than the seal ring 6 so as to contact both forward and aft mating rings 4, 5, thus allowing the seal ring 6 to translate between the mating rings 4, 5. The mating rings 4, 5, spacer ring 8, and seal ring 6 are disposed between an inner shaft 3 and an outer shaft 2 which are concentric and rotatable in either a co-rotating or counter-rotating fashion. The mating rings 4, 5 and spacer ring 8 are secured to the inner shaft 3 via a stop ring 7 so as to rotate with the inner shaft 3. The seal ring 6 is dimensioned so as to at most partially contact the outer shaft 2 when the outer and inner shafts 2, 3 are at rest. The seal ring 6 further includes at least one circumferential space or gap which allows the seal ring 6 to flex or expand as it rotates so as to then contact and rotate with the outer shaft 2 separate from the inner shaft 3. Contact between the rotating seal ring 6 and mating rings 4, 5 is avoided to minimize friction-induced wear along the sides of the seal ring 6.

Contact between a rotating seal ring 6 and mating rings 4, 5 is minimized by a thin-film interposed between the seal ring 6 and forward mating ring 4 and between the seal ring 6 and aft mating ring 5. The thin film is produced by communicating fluid, examples including but not limited to air and air/oil mixture, from the high pressure region to the low pressure region along a path defined by spaces between the seal ring 6 and the outer and inner shafts 2, 3 and mating rings 4, 5, and axially through passages.

With reference to FIGS. 1-3, fluid flows from the higher pressure region through a plurality of horizontal ports 9 through the forward mating ring 4 and across a forward annular space 12 between the forward mating ring 4 and outer shaft 2. The same fluid flows around the seal ring 6 and through the seal ring 6 via horizontal ports 14. Thereafter, the fluid flows to the lower pressure region via an aft annular space 13 between the outer shaft 2 and the aft mating ring 5.

The forward and aft mating rings 4, 5 include a plurality of spiral grooves 11, as shown in FIGS. 2 and 3. The spiral grooves 11 include a plurality of recessed arcuate slots along the surface of the forward and aft mating rings 4, 5. The spiral grooves 11 communicate a hydrodynamic lift force onto the seal ring 6 via a pressure field along the spaces between the mating rings 4, 5 and seal ring 6. This hydrodynamic lift force increases exponentially as the seal ring 6 translates toward one of the mating rings 4, 5, thereby preventing the seal ring 6 from contacting the mating rings 4, 5 under dynamic conditions. FIGS. 4 and 5 graphically present non-symmetric pressure profiles produced by the forward and aft mating rings 4, 5, respectively, across the width of the seal ring 6.

It is well known that large non-symmetric counter forces generated by hydrodynamic grooves cause a sealing ring to twist thus compromising the parallelism between the mating rings or runners and the sealing ring. Often, the result is radial and angular distortions which produce "coning" along the sealing ring. Coning is understood to cause excessive wear along a sealing ring and to degrade the performance of a sealing system.

Lipschitz explicitly recognizes this problem and suggests for the sealing ring to be composed of materials having a high modulus of elasticity to minimize undesirable radial and angular deflections imposed by unbalanced hydrodynamic forces. As such, Lipschitz teaches away from pressure-based solutions to the twisting problem.

With reference to FIGS. 6 and 7a-7c, another intershaft seal assembly 30 is shown including a forward mating ring 33 and an aft mating ring 34 disposed about a piston ring 35 between rotatable inner and outer shafts 31, 32. The piston ring 35 is concentrically aligned with a spacer ring 36, so that the piston ring 35 translates between the forward and aft mating rings 33, 34. The piston 35 and spacer ring 36 are separated by an annular gap 40. The piston ring 35 is dimensioned and includes one or more gaps so as to flex or expand as the inner and outer shafts 31, 32 rotate, thereby contacting the outer shaft 32 and rotating therewith. The forward and aft mating rings 33, 34 and spacer ring 36 are secured to a carrier 37 via a stop ring 54 so as to rotate with the inner shaft 31. An annular space 38, 39 is provided along the forward mating ring 33 and aft mating ring 34, respectively, so as to avoid contact with the outer shaft 32. Fluid from the high pressure region passes over the forward mating ring 33, around the piston ring 35, and then over the aft mating ring 34 into the low pressure region.

In this design, conventional hydrodynamic grooves are positioned along the faces 42, 41 of the forward and aft mating rings 33, 34, respectively, to improve flow around the piston ring 35 and to minimize contact between the piston ring 35 and mating rings 33, 34. The face 41 along the aft mating ring 34 includes a plurality of outward flow hydrodynamic grooves 43, as represented in FIG. 7b. The face 42 of the forward mating ring 33 includes a plurality of inward flow hydrodynamic grooves 44, as represented in FIG. 7c. Hydrodynamic grooves 43, 44 are generally arcuate-shaped, shallow slots along the surface of the respective mating rings 33, 34.

With reference to FIG. 7d, the inward and outward flow hydrodynamic grooves 44, 43 each communicate a generally non-symmetric, triangular-shaped pressure profile 15, 16 onto opposing sides of the piston ring 35. This means that the piston ring 35 experiences higher pressures and larger unbalanced forces near the inner diameter along the forward mating ring 33 and near the outer diameter along the aft mating ring 34. The resultant deflections cause the piston ring 35 to twist 17 allowing the piston ring 35 to rub against the aft mating ring 34 so as to impart a wear pattern 18 with pronounced wear depth 45 adjacent to the inner diameter of the piston ring 35. Similar wear is likewise possible along the piston ring 35 near the outer diameter adjacent to the forward mating ring 33. In this example, material properties alone are not sufficient to avoid the distortions and wear at the higher relative rotational speeds required to further improve the performance of turbine engines with concentrically rotating shafts.

Lindeboom describes a straight leakoff seal for use within a centrifugal pump in U.S. Pat. No. 3,751,045. With reference to FIGS. 8 and 9, the centrifugal pump 20 includes a housing 21 with a collar 23 disposed about a drive shaft 22. An annular dam 26 is disposed along a sealing ring 24 toward the outer diameter thereof adjacent to the high-pressure end of the centrifugal pump 20. A plurality of v-shaped grooves 25 are equally spaced circumferentially about sealing ring 24. The v-shaped grooves 25 pump fluid from an outer region to an inner region by allowing the fluid to enter one end and exit the other end of the v-shaped grooves 25 causing the face pressure profile to grow, thus preventing contact between the sealing ring 24 and collar 23. As such, Lindeboom does not allow for apex-centric flow patterns along the v-shaped grooves 25.

Lindeboom describes the advantages of his invention via reference to the pressure profiles reproduced in FIG. 10, wherein reference "B" describes the non-hydrodynamic pressure forces acting along the back end of the sealing ring 24, reference "C" describes the hydrodynamic pressure forces acting along the interface between the collar 23 and sealing ring 24, and reference "D" describes the maximum restoring forces which prevent contact between the sealing ring 24 and collar 23 under dynamic running conditions. The pressure profiles reported by Lindeboom along the interface across the dam 26 and between the collar 23 and sealing ring 24 across the sealing ring 24 are non-symmetric. As such, Lindeboom neither suggests nor teaches the generation of a symmetric pressure profile along the width of a seal ring via symmetrically-shaped grooves.

As is readily apparent from the discussions above, the related arts do not include an intershaft seal system which minimizes twist along a seal or piston ring via the communication of a substantially symmetric pressure field across the width of the ring via a plurality of substantially symmetric hydrodynamic pockets.

Accordingly, what is required is an intershaft seal system which communicates a substantially symmetric pressure field across the width of a piston ring onto at least one side thereof via a plurality of substantially symmetric hydrodynamic pockets which receive fluid from a high pressure region and separate the flow in a divergent fashion prior to communicating the fluid onto the ring.

SUMMARY OF THE INVENTION

An object of the invention is to provide an intershaft seal system which communicates a substantially symmetric pressure field across the width of a piston ring onto at least one side thereof via a plurality of substantially symmetric hydrodynamic pockets which receive fluid from a high pressure region and separate the flow in a divergent fashion prior to communicating the fluid onto the ring.

In accordance with some embodiments, the intershaft seal system includes a forward mating ring adjacent to a high pressure region and an aft mating ring adjacent to a low pressure region whereby both rings are disposed about and separately rotatable from a piston ring. The forward and/or aft mating rings include a plurality of divergent flow grooves adjacent to the piston ring. Each divergent flow groove includes a pair of grooves which intersect at an apex so that the grooves are arranged substantially symmetric about the apex with respect to the rotational direction of the piston ring. Fluid from the high pressure region is directed onto each apex as the piston ring rotates with respect to the divergent flow grooves. The divergent flow grooves produce a fluid pressure force which is substantially symmetric widthwise across the piston ring along at least one face of the ring so as to minimize twisting thereof.

In accordance with other embodiments, the depth or the width of each pair of grooves could vary along the length of the divergent flow groove.

In accordance with other embodiments, the forward mating ring could include hydrodynamic grooves which communicate a non-symmetric fluid pressure force onto the piston ring when only the aft mating ring includes divergent flow grooves or the aft mating ring includes hydrodynamic grooves which communicate a non-symmetric fluid pressure force onto the piston ring when only the forward mating ring includes divergent flow grooves.

In accordance with other embodiments, the depth or width of each hydrodynamic groove could vary along the length thereof.

In accordance with other embodiments, the piston ring could include channels which direct fluid through the piston ring and onto the apexes along the aft mating ring when divergent flow grooves are provided along the aft ring.

In accordance with other embodiments, the forward mating ring could include ports which allow fluid to enter the channels along the inner diameter of the piston ring so as to exit the channels adjacent to the apexes.

In accordance with other embodiments, the piston ring could include at least one circumferential groove disposed thereon so as to communicate fluid from at least one channel onto at least one divergent flow groove.

In accordance with other embodiments, fluid could enter the channels along the outer diameter of the piston ring and exit the channel adjacent to the apexes. The aft mating ring could include a plurality of ports which allow fluid to enter the low pressure region.

In accordance with other embodiments, the forward mating ring could include ports which communicate fluid from the high pressure region to the apexes along the forward mating ring when divergent flow channels are provided along the forward ring.

In accordance with other embodiments, the forward mating ring could include a plurality of ports which allow fluid to enter the channels along the forward face of the piston ring.

In accordance with other embodiments, the outer diameter face of the piston ring could include at least one groove which forms a dam so as to restrict flow of fluid between the piston ring and outer shaft. The dam could be adjacent to the low pressure region or the high pressure region.

Several advantages are offered by the invention. The invention minimizes distortional effects along a piston ring caused by hydrodynamic loads which otherwise prevent the ring from contacting a mating ring as the piston ring translates between a pair of mating rings. The invention exploits the symmetry of the divergent flow grooves so as to produce a substantially symmetric pressure field communicable radially widthwise across a piston ring. The invention minimizes piston ring wear within turbine engines including counter-rotating shafts operating at high rotational speeds, thus reducing engine maintenance.

BRIEF DESCRIPTION OF THE INVENTION

The invention will now be described in more detail, by way of example only, with reference to the accompanying drawings.

FIG. 1 is a cross-sectional view illustrating an intershaft seal assembly disposed between rotatable, concentric inner and outer shafts and further including a seal ring disposed between a pair of mating rings as described by Lipschitz in U.S. Pat. No. 4,972,986.

FIG. 7b is a front side view illustrating a plurality of outward flow hydrodynamic grooves disposed along the face of the aft mating ring in FIG. 7a.

FIG. 7c is a front side view illustrating a plurality of inward flow hydrodynamic grooves disposed along the face of the forward mating ring in FIG. 7a.

Figure 8:
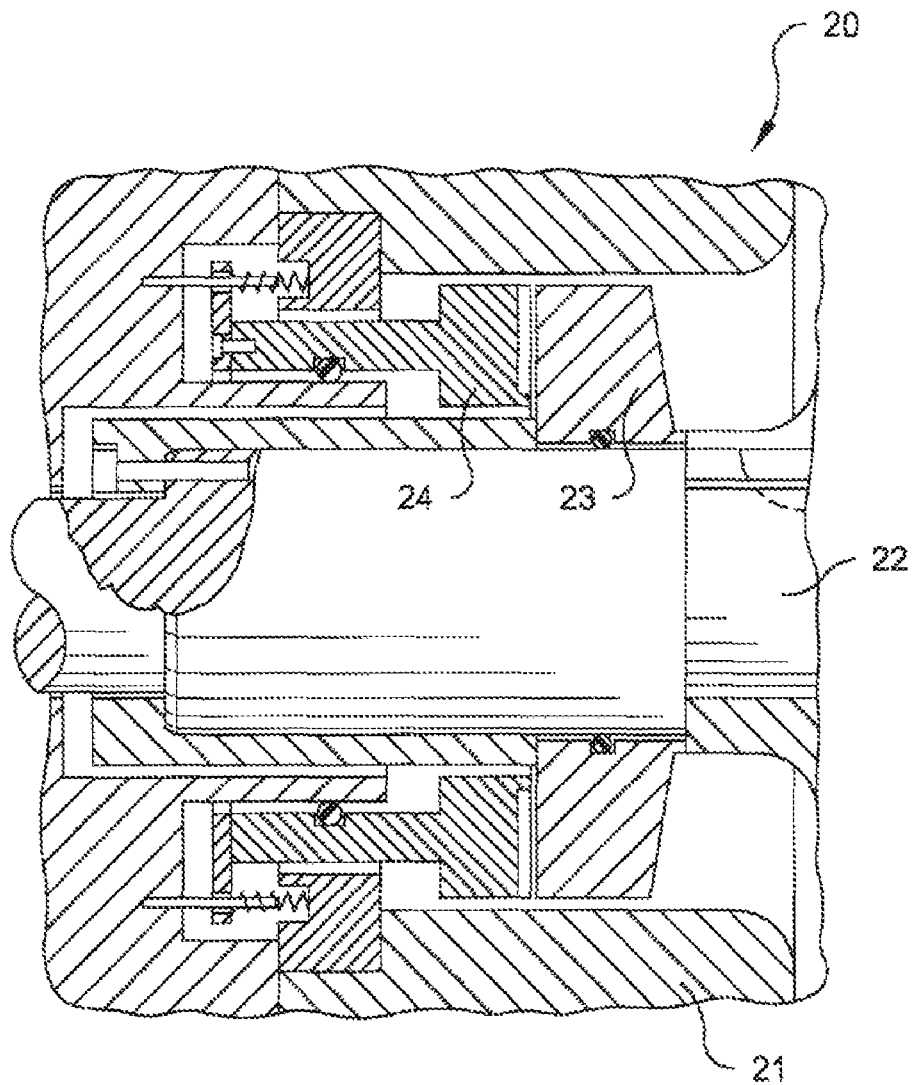

FIG. 8 is a partial section view illustrating a seal assembly within a centrifugal pump as described by Lindeboom in U.S. Pat. No. 3,751,045.

Figure 9:
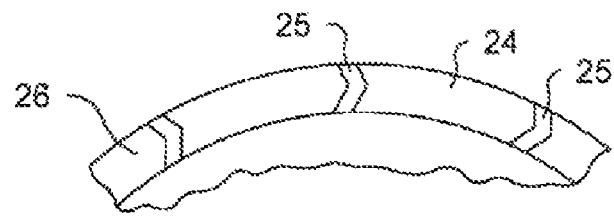

FIG. 9 is an enlarged fragmentary view illustrating a plurality of v-shaped grooves disposed along the face of the seal ring in FIG. 8.

Figure 10:
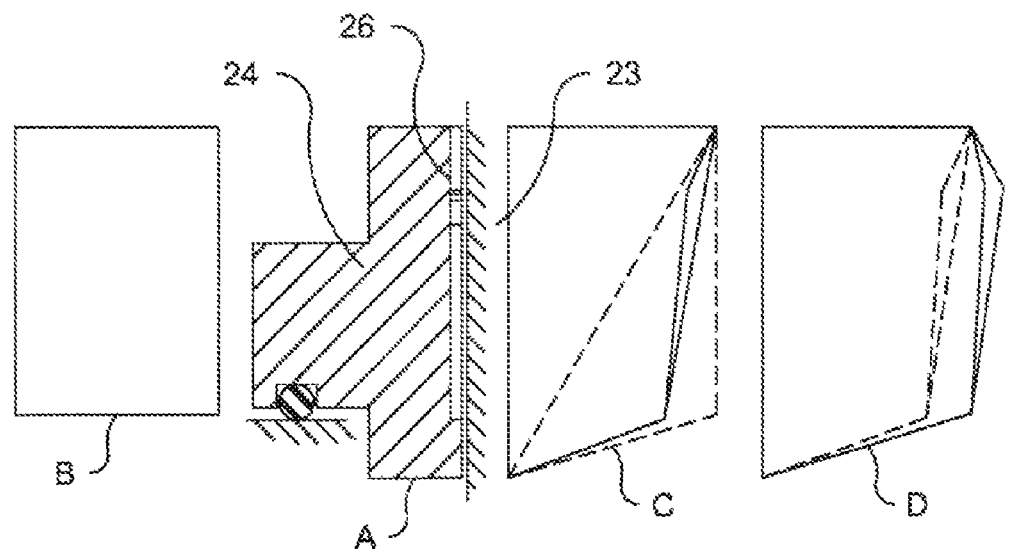

FIG. 10 is a schematic illustrating the distribution of fluid pressure forces along the collar in FIG. 8.

Figure 11A:
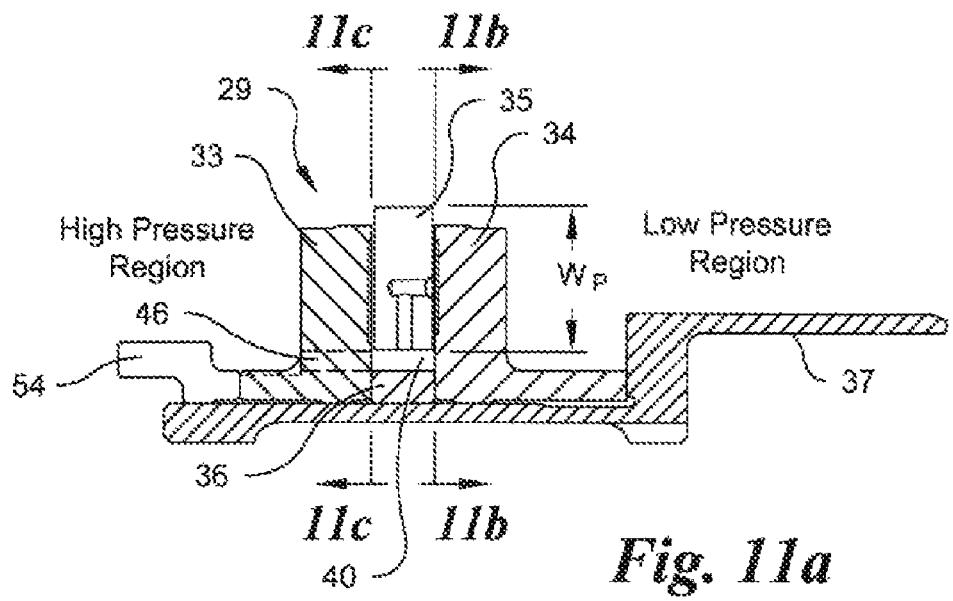

FIG. 11a is a cross-sectional view illustrating an intershaft seal system including a piston ring with channels that direct fluid from the high pressure region upward and onto a plurality of divergent flow grooves disposed along the aft mating ring so as to produce a substantially symmetric fluid pressure profile across the width of the aft face of the piston ring in accordance with an embodiment of the invention.

Figure 11B:
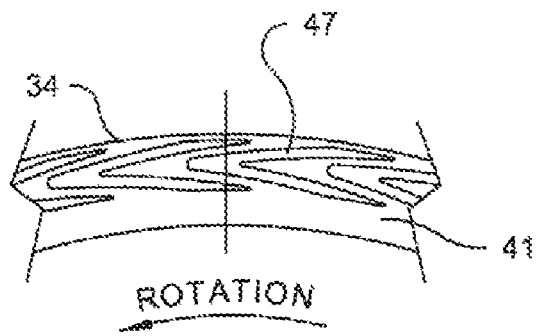

FIG. 11b is an enlarged side view illustrating the divergent flow grooves disposed along the face of the aft mating ring in accordance with an embodiment of the invention.

Figure 11C:
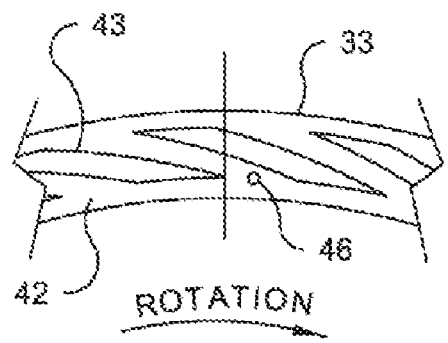

FIG. 11c is an enlarged side view illustrating outward flow hydrodynamic grooves disposed along the face of the forward mating ring in accordance with an embodiment of the invention.

Figure 11D:
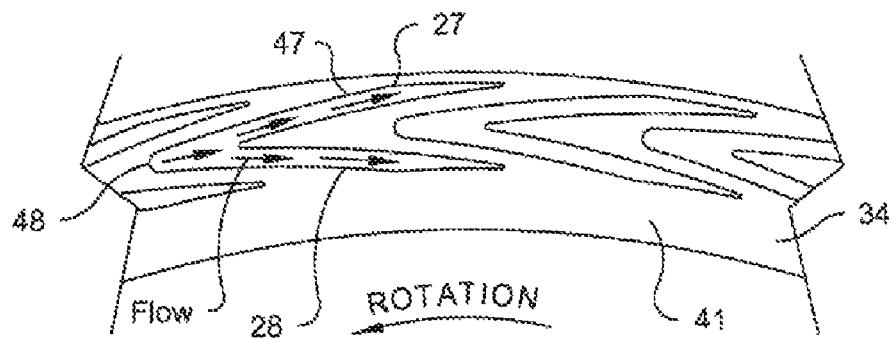

FIG. 11d is an enlarged side view illustrating substantially symmetric divergent flow grooves oriented along the aft mating ring whereby flow entering substantially near the apex of each divergent flow groove is separated into the groove pair in accordance with an embodiment of the invention.

Figure 11E:
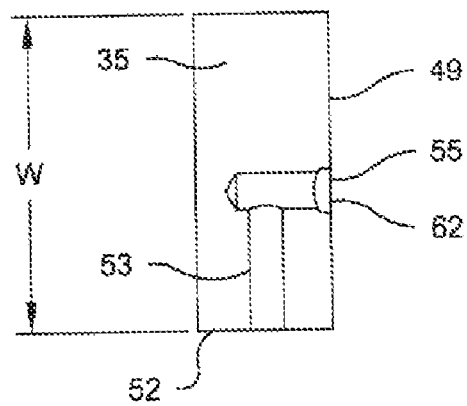

FIG. 11e is an enlarged section view illustrating channels disposed within the piston ring which direct fluid originating from the high pressure region upward onto the face of the aft mating ring adjacent to the apex of each divergent flow groove in accordance with an embodiment of the invention.

Figure 11F:
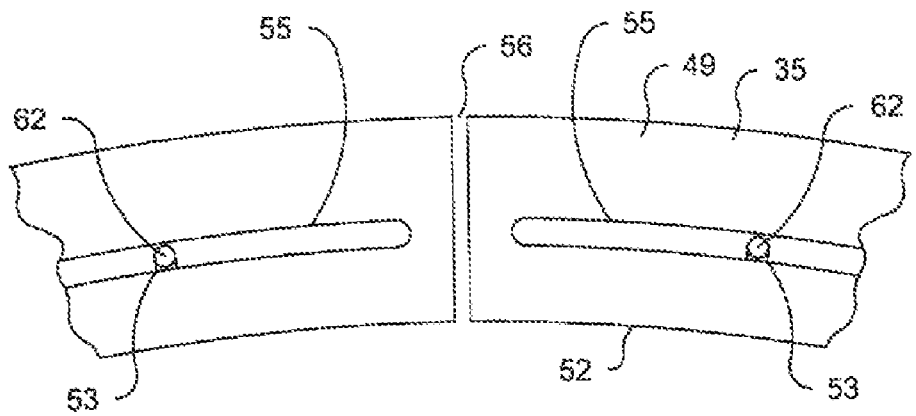

FIG. 11f is an enlarged side view illustrating the outlets along the aft face of the piston ring with optional grooves that simultaneously communicate fluid onto the apex of one or more divergent flow grooves along the face of the mating ring in accordance with an embodiment of the invention.

Figure 11G:
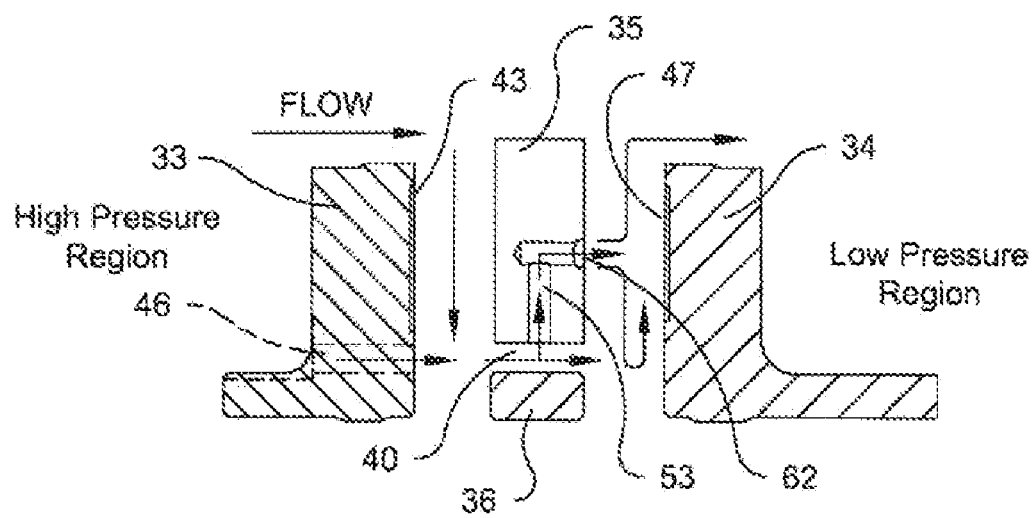

FIG. 11g is an enlarged exploded cross-sectional view illustrating flow patterns between the high and low pressure regions across and around the forward mating ring, piston ring, and aft mating ring in accordance with an embodiment of the invention.

Figure 11H:
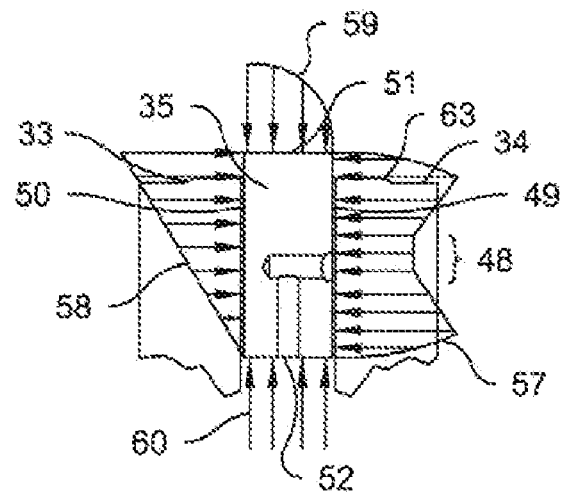
Figure 1I:
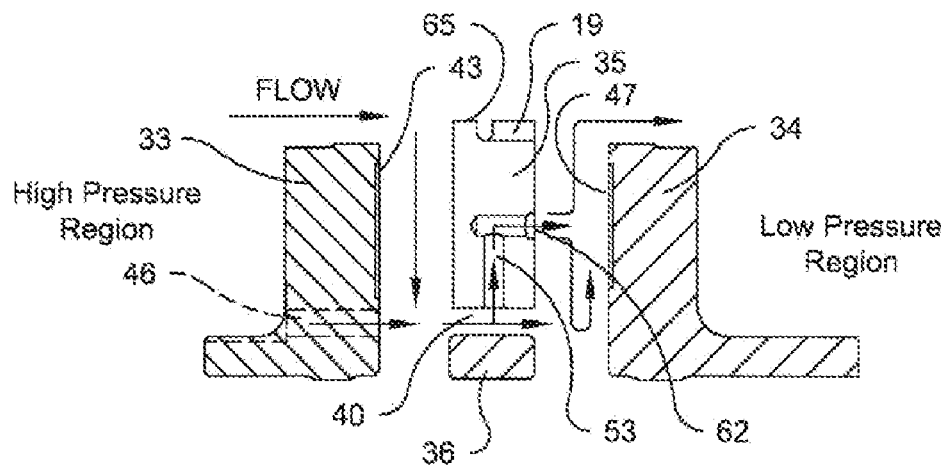
Figure 1I:
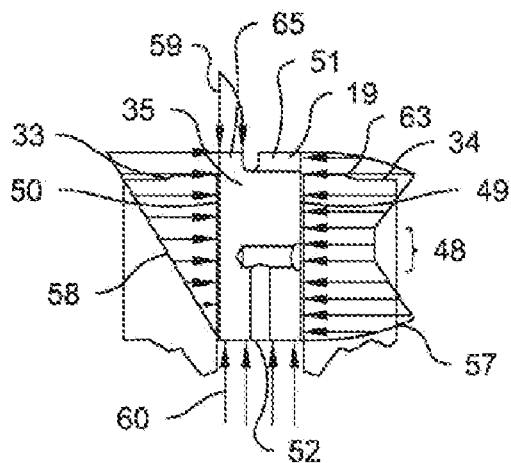

FIG. 11h is a schematic illustrating steady-state fluid pressures about the cross section of a piston ring with particular reference to the substantially symmetric pressure profile along the aft face about the apexes of the divergent flow grooves in accordance with an embodiment of the invention.

FIG. 11i is an enlarged exploded cross-sectional view illustrating flow patterns between the high and low pressure regions across and around the forward mating ring, piston ring with dam adjacent to the high pressure region, and aft mating ring in accordance with an embodiment of the invention.

FIG. 11j is a schematic illustrating steady-state fluid pressures about the cross section of a piston ring having a dam adjacent to the high pressure region with particular reference to the substantially symmetric pressure profile along the aft face about the apexes of the divergent flow grooves and reduced pressure profile along the outer diameter of the piston ring in accordance with an embodiment of the invention.

Figure 12A:
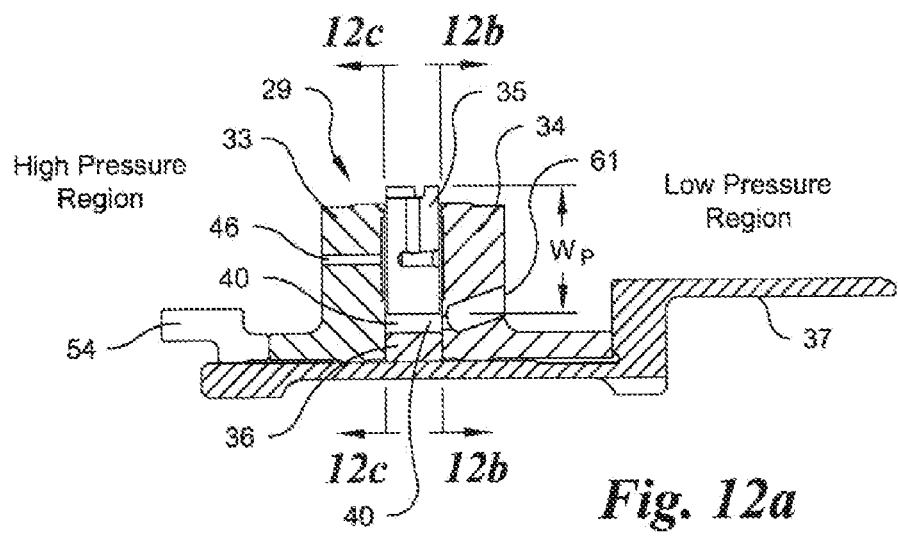

FIG. 12a is an enlarged cross-sectional view illustrating an intershaft seal system including a forward mating ring and a piston ring with channels that direct fluid from the high pressure region onto the apexes of a plurality of divergent flow grooves disposed along the forward and aft mating rings so as to produce substantially symmetric fluid pressure forces across the width of the forward and aft faces of the piston ring in accordance with an embodiment of the invention.

Figure 12B:
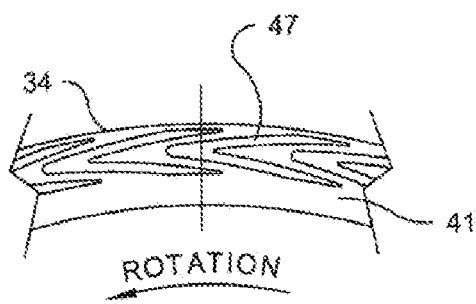

FIG. 12b is an enlarged side view illustrating the divergent flow grooves disposed along the face of the aft mating ring in accordance with an embodiment of the invention.

Figure 12C:
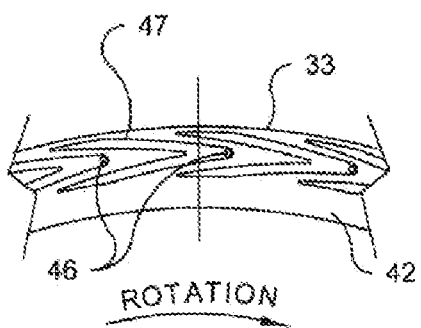

FIG. 12c is an enlarged side view illustrating the divergent flow grooves disposed along the face of the forward mating ring in accordance with an embodiment of the invention.

Figure 12D:
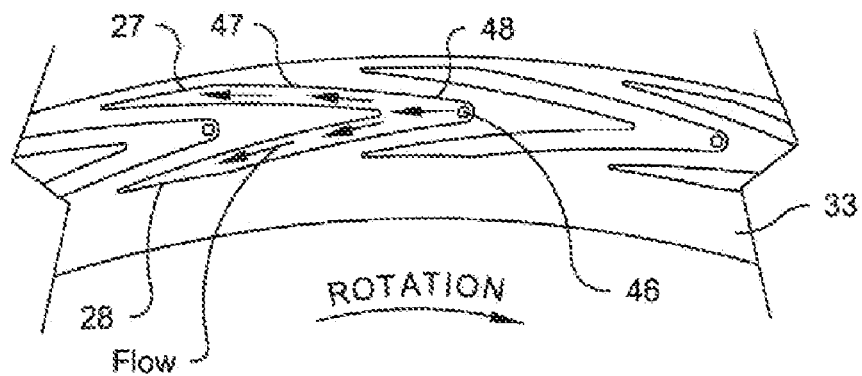

FIG. 12d is an enlarged side view illustrating the divergent flow grooves which are each substantially symmetric about an apex and oriented along the forward mating ring so as to separate the flow entering each groove substantially near the apex via a port in accordance with an embodiment of the invention.

Figure 12E:
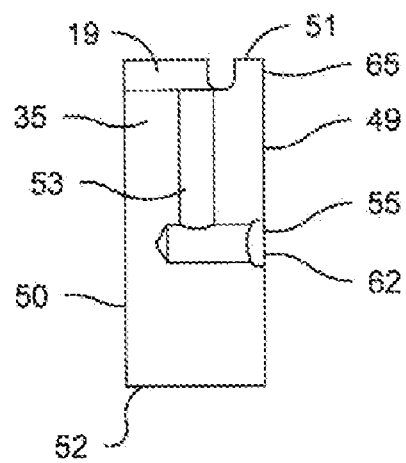

FIG. 12e is an enlarged section view illustrating channels disposed within the piston ring which direct fluid originating from the high pressure region downward onto the face of the aft mating ring adjacent to the apex of each divergent flow groove in accordance with an embodiment of the invention.

Figure 12F:
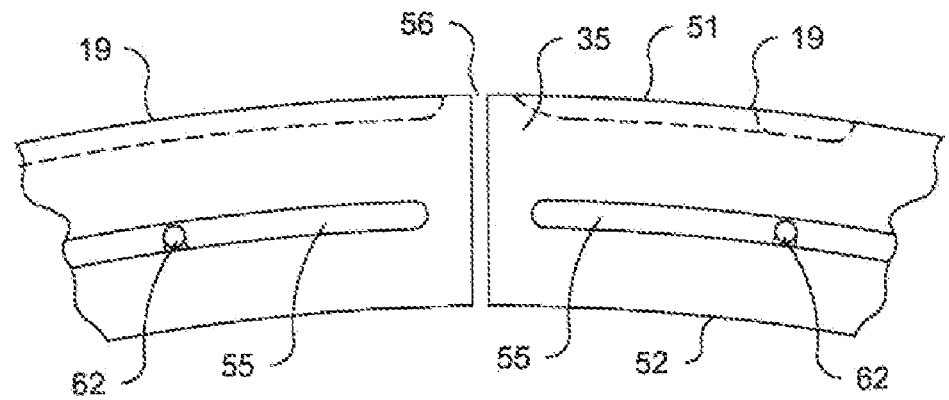

FIG. 12f is an enlarged side view illustrating the outlets along the aft face of the piston ring with optional upper grooves which direct fluid into the channels within the piston ring and optional grooves that simultaneously communicate fluid onto one or more apexes of the divergent flow grooves along the face of the mating ring in accordance with an embodiment of the invention.

Figure 12G:
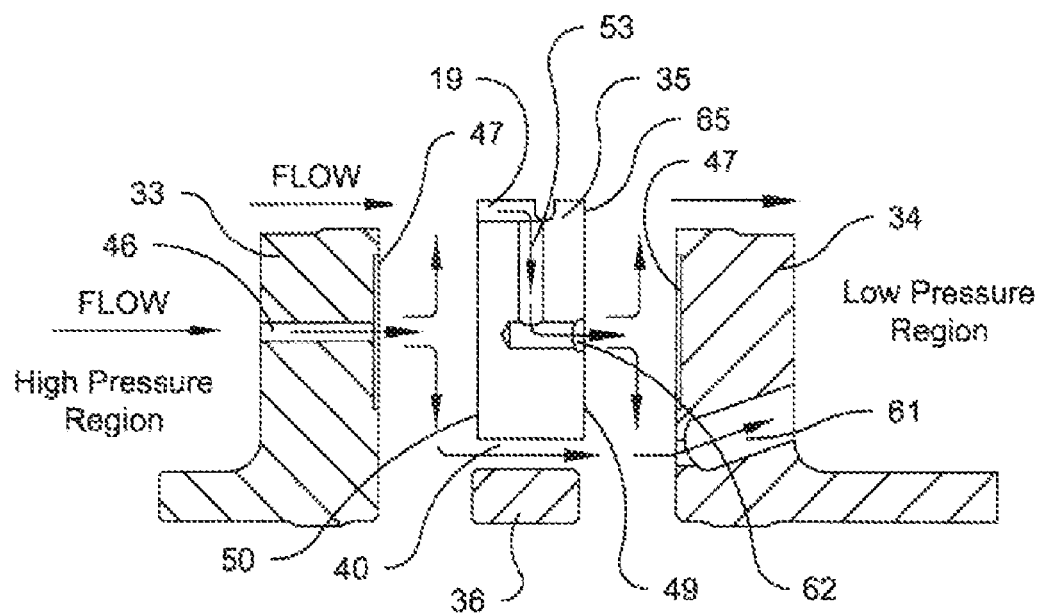

FIG. 12g is an enlarged exploded cross-sectional view illustrating flow patterns between the high and low pressure regions across the forward mating ring, piston ring, and aft mating ring in accordance with an embodiment of the invention.

Figure 12H:
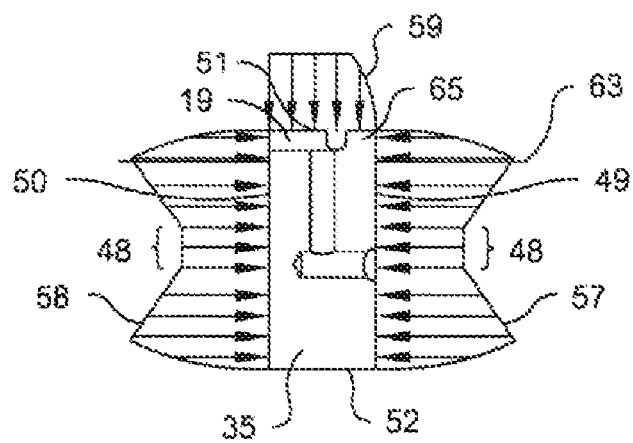

FIG. 12h is a schematic illustrating steady-state fluid pressure forces about the cross section of a piston ring with particular reference to the substantially symmetric pressure profiles along the forward and aft faces adjacent to the divergent flow grooves in accordance with an embodiment of the invention.

Figure 12I:
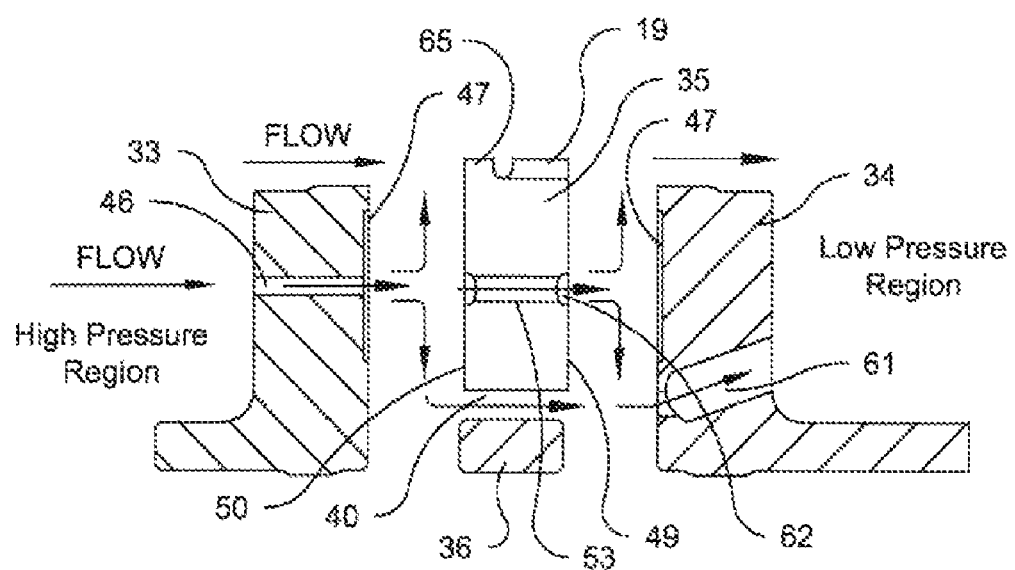

FIG. 12i is an enlarged exploded cross-sectional view illustrating flow patterns between the high and low pressure regions across the forward mating ring, piston ring with dam adjacent to the high pressure region, and aft mating ring in accordance with an embodiment of the invention.

Figure 12J:
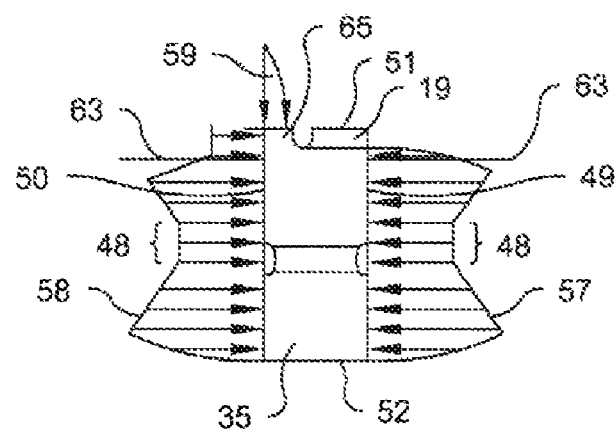

FIG. 12j is a schematic illustrating steady-state fluid pressure forces about the cross section of a piston ring having a dam adjacent to the high pressure region with particular reference to the substantially symmetric pressure profiles along the forward and aft faces adjacent to the divergent flow grooves and reduced pressure along the outer diameter of the piston ring in accordance with an embodiment of the invention.

Figure 13A:
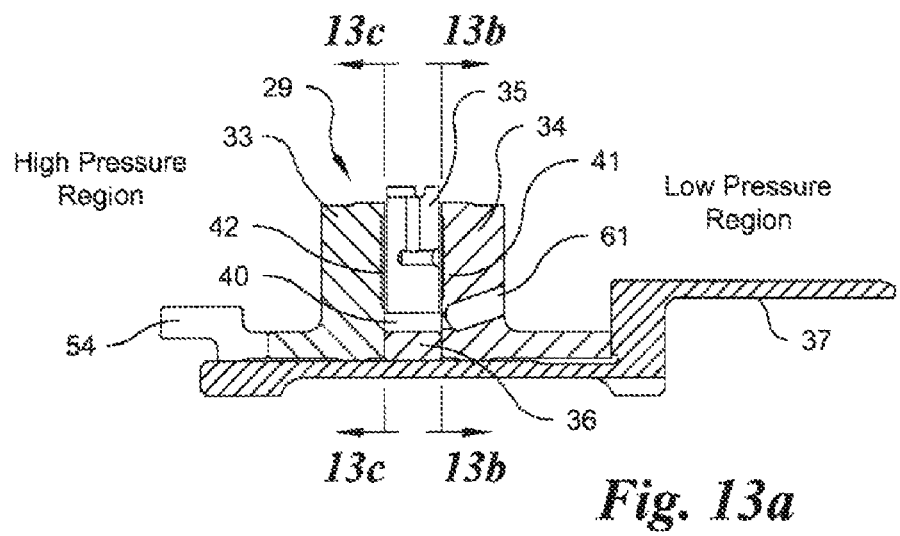

FIG. 13a is an enlarged cross-sectional view illustrating an intershaft seal system including a piston ring with channels that direct fluid from the high pressure region downward onto a plurality of divergent flow grooves disposed along the aft mating ring so as to produce substantially symmetric fluid pressure forces across the width of the aft face of the piston ring in accordance with an embodiment of the invention.

Figure 13B:
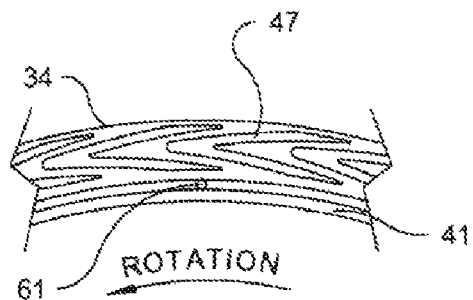

FIG. 13b is an enlarged side view illustrating the divergent flow grooves disposed along the face of the aft mating ring in accordance with an embodiment of the invention.

Figure 13C:
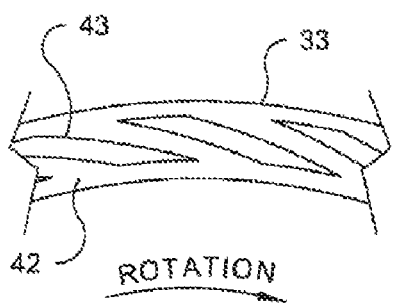

FIG. 13c is an enlarged side view illustrating outward flow hydrodynamic grooves disposed along the face of the forward mating ring in accordance with an embodiment of the invention.

Figure 13D:
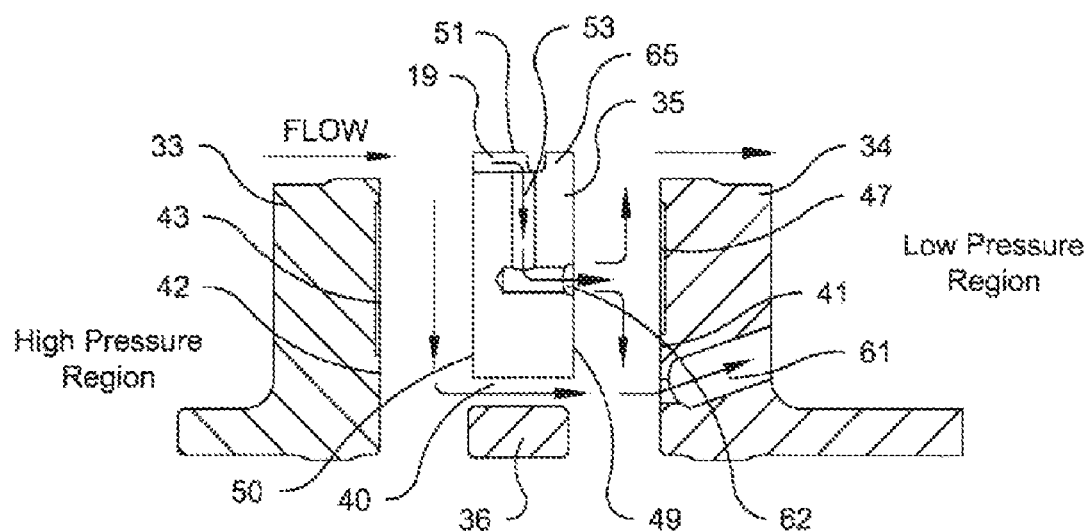

FIG. 13d is an enlarged exploded cross-sectional view illustrating flow patterns between the high and low pressure regions across the forward mating ring, piston ring, and aft mating ring in accordance with an embodiment of the invention.

Figure 13E:
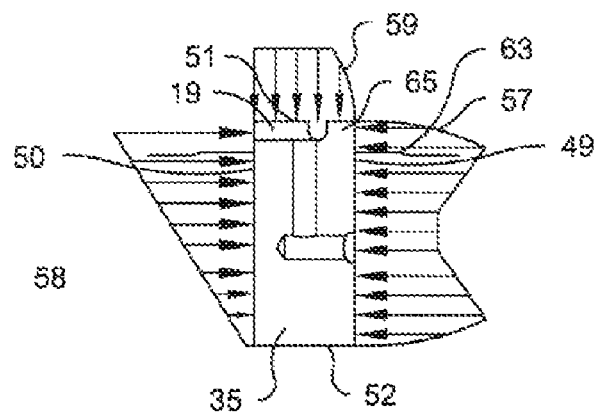

FIG. 13e is a schematic illustrating steady-state fluid pressures about the cross section of a piston ring with particular reference to the substantially symmetric pressure profile along the aft face adjacent to the divergent flow grooves in accordance with an embodiment of the invention.

Figure 14A:
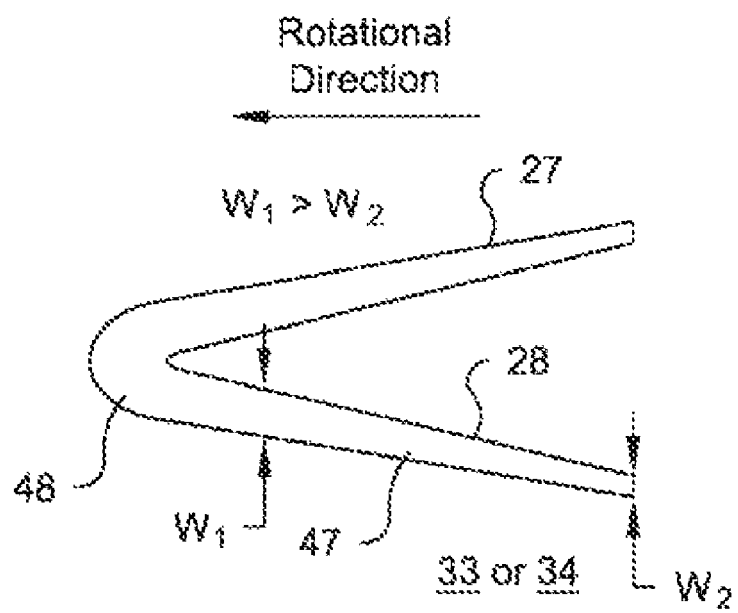

FIG. 14a is a plan view illustrating a divergent flow groove including two grooves intersecting at an apex whereby the groove width decreases with distance from the apex in accordance with an embodiment of the invention.

Figure 14B:
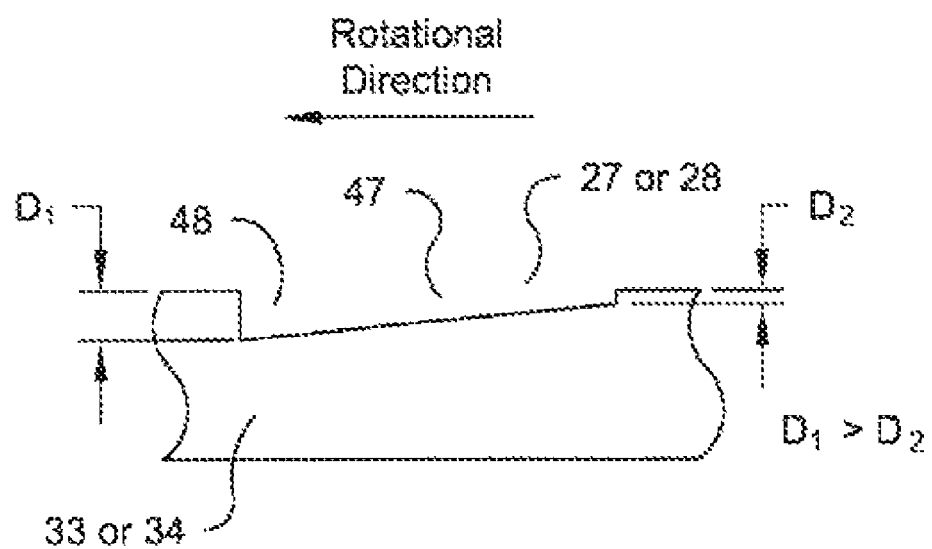

FIG. 14b is a cross-sectional view illustrating a divergent flow groove whereby the groove depth decreases with distance from the apex in accordance with an embodiment of the invention.

Figure 15A:
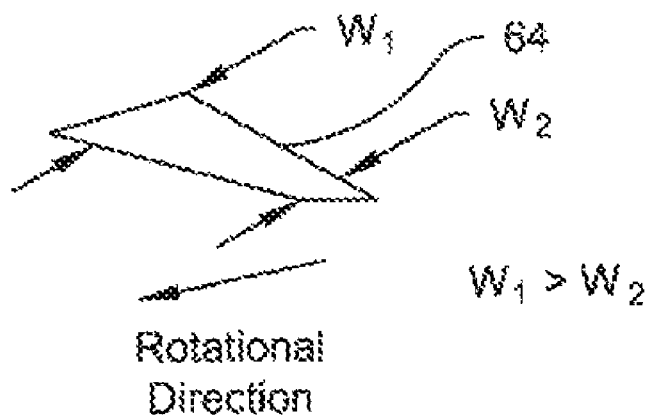

FIG. 15a is a plan view illustrating a hydrodynamic groove whereby the groove width decreases opposite of the rotational direction in accordance with an embodiment of the invention.

Figure 15B:
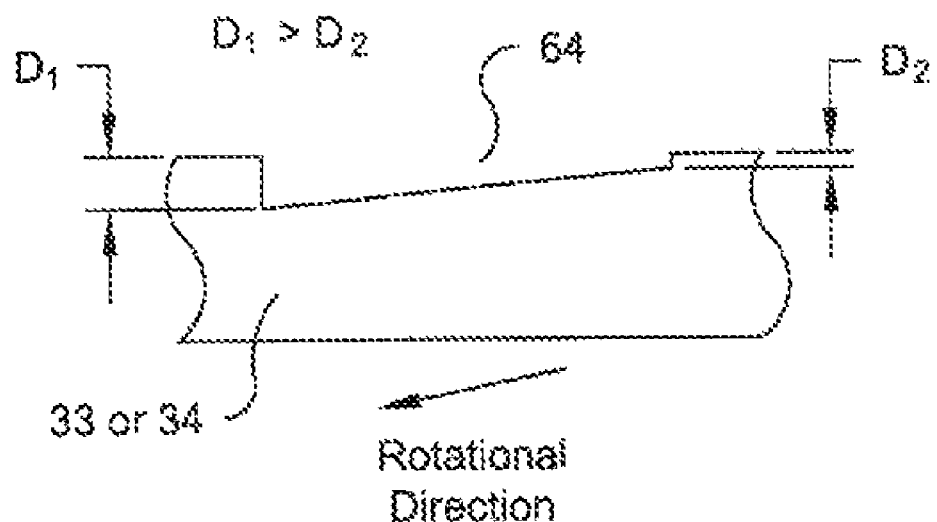

FIG. 15b is a cross-sectional view illustrating a groove whereby the groove depth decreases opposite of the rotational direction in accordance with an embodiment of the invention.

DETAILED DESCRIPTION OF THE INVENTION

Reference will now be made in detail to several preferred embodiments of the invention that are illustrated in the accompanying drawings. Wherever possible, same or similar reference numerals are used in the drawings and the description to refer to the same or like parts or steps. The drawings are in simplified form and are not to precise scale.

While features of various embodiments are separately described throughout this document, it is understood that two or more such features could be combined into a single embodiment.

Figure 1:
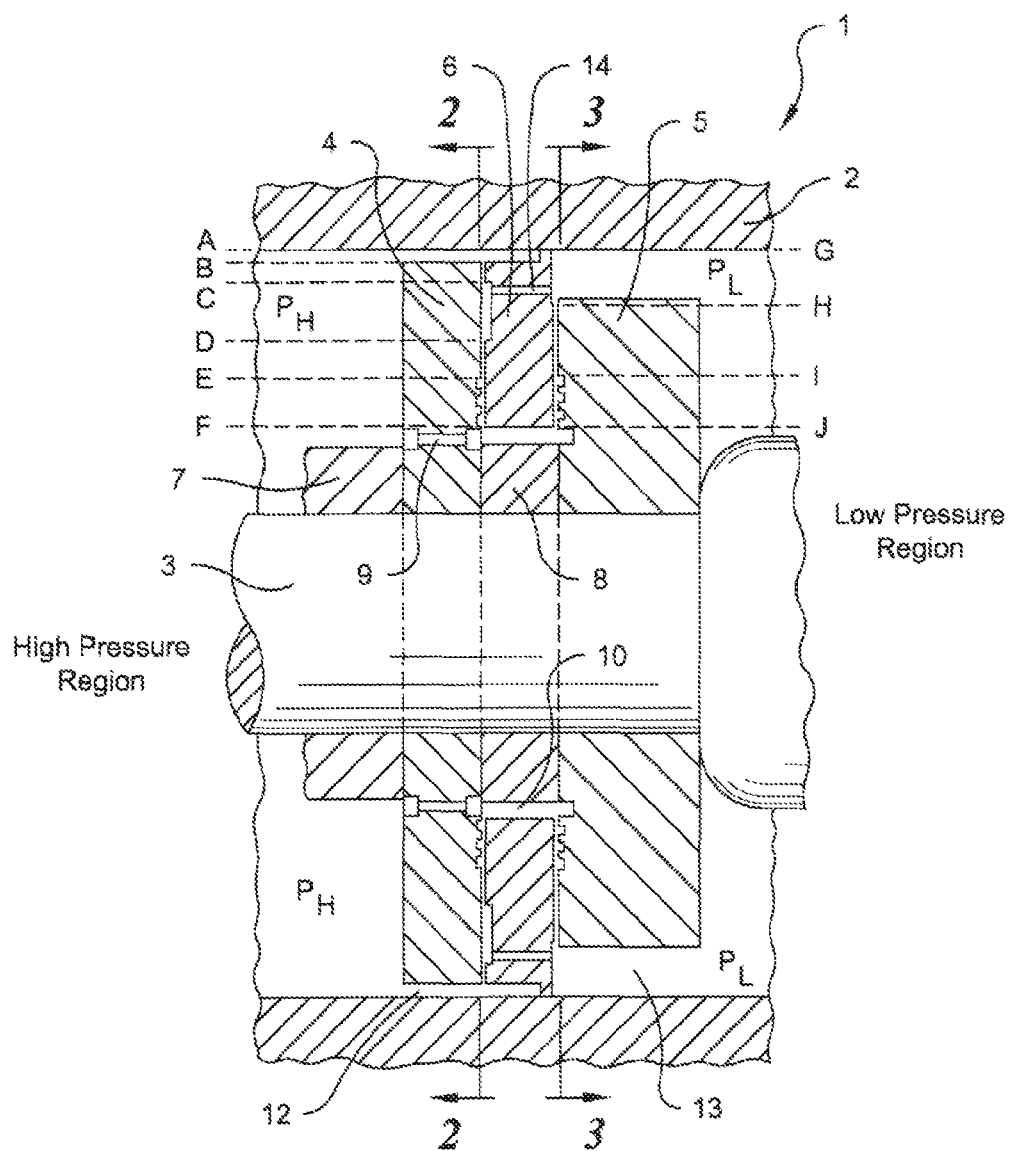
Figure 2:
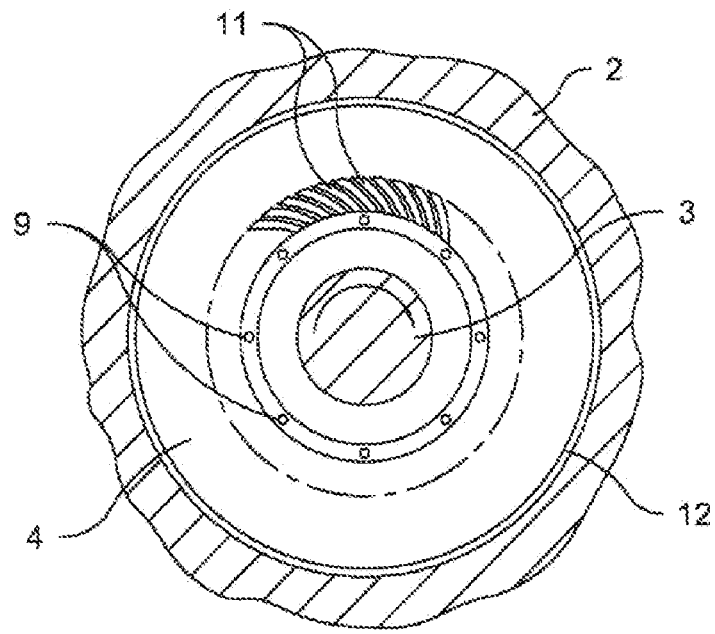
FIG. 2 is a cross-sectional view from FIG. 1 illustrating the inner surface of the forward mating ring with a plurality of spiral grooves disposed thereon.
Figure 3:
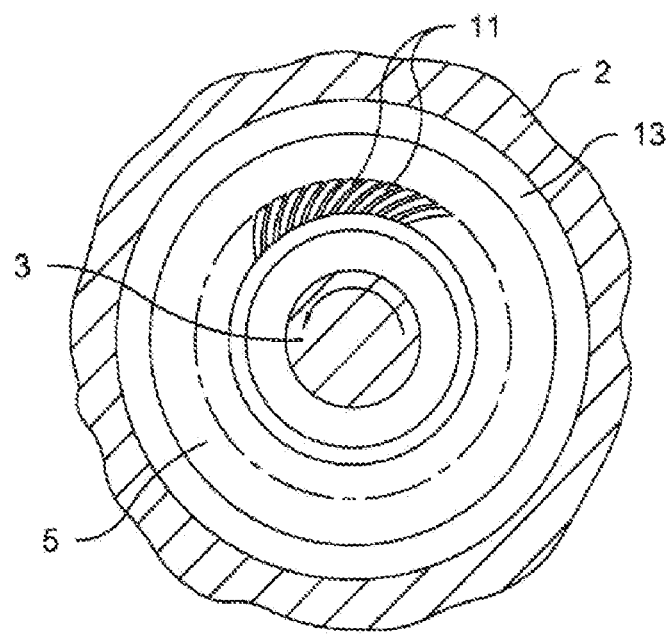
FIG. 3 is a cross-sectional view from FIG. 1 illustrating the inner surface of the aft mating ring with a plurality of spiral grooves disposed thereon.
Figure 4:
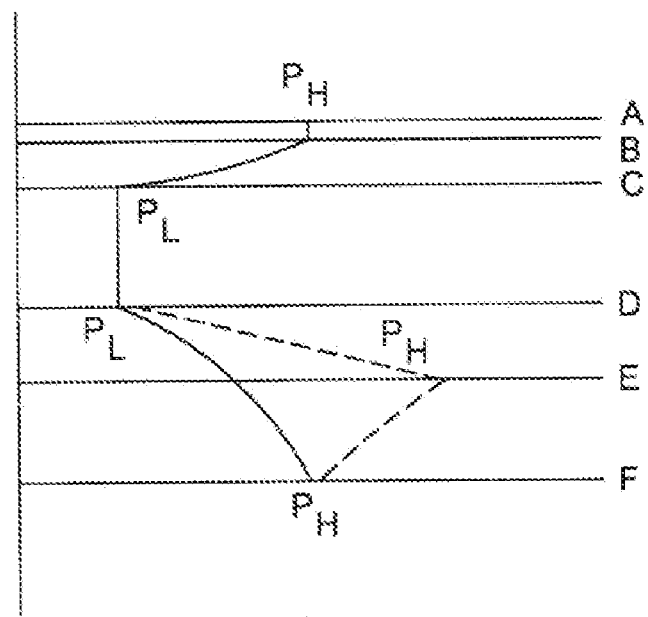
FIG. 4 is a schematic illustrating the distribution of fluid pressures along the forward surface of the seal ring in FIG. 1.
Figure 5:
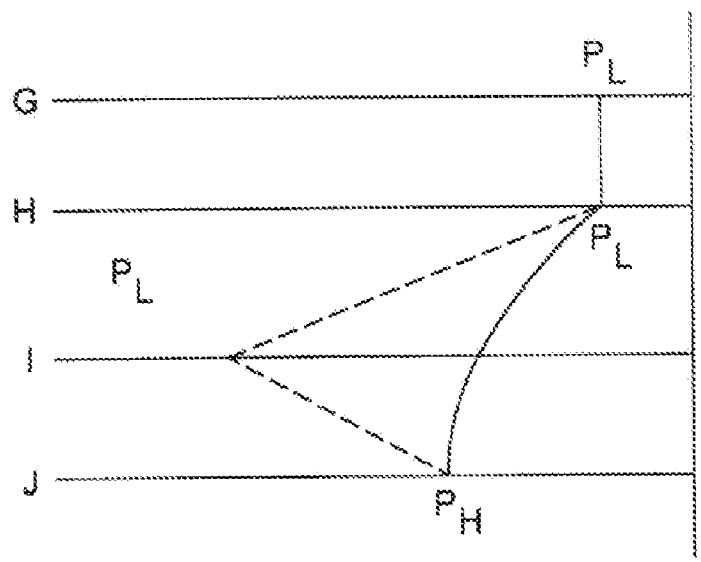
FIG. 5 is a schematic illustrating the distribution of fluid pressures along the aft surface of the seal ring in FIG. 1.
Figure 6:
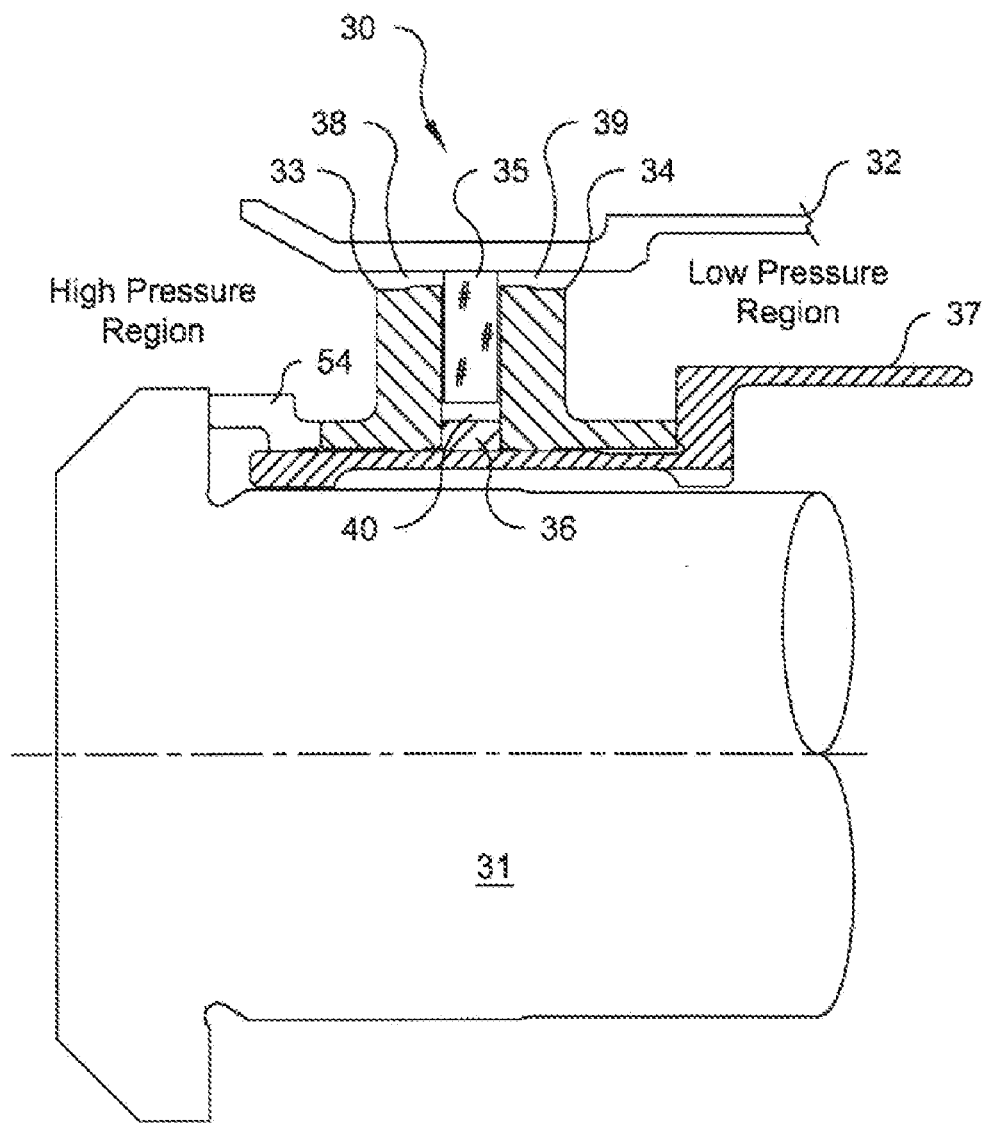
FIG. 6 is a partial cross-sectional view illustrating another intershaft seal assembly disposed between counter-rotating inner and outer shafts and further including forward and aft mating rings disposed along a carrier about a piston ring.
Figure 7A:
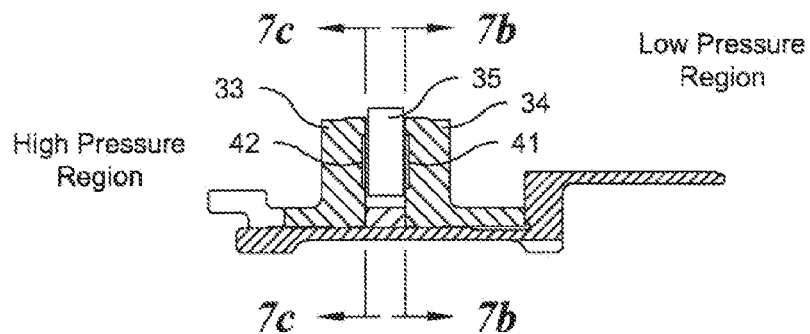
FIG. 7a is a cross-sectional view illustrating the intershaft seal assembly in FIG. 6.
Figure 7B:
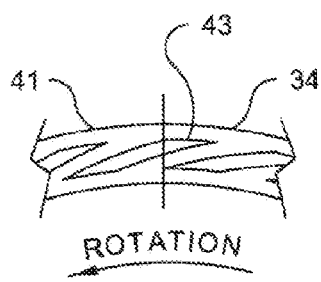
Figure 7C:
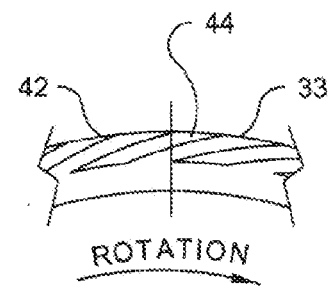
Figure 7D:
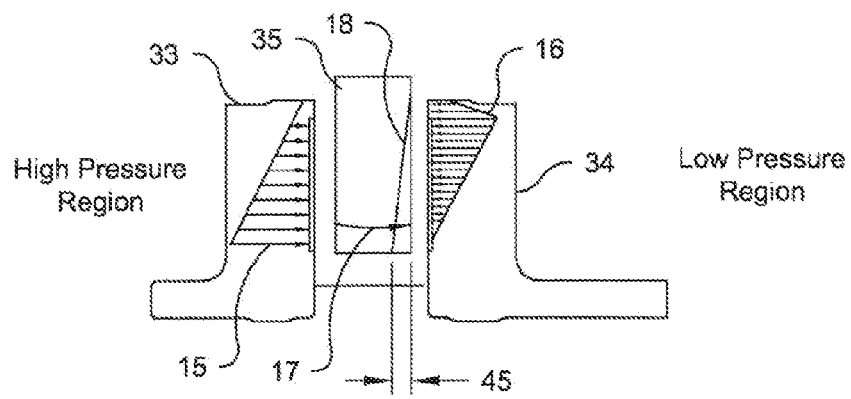
FIG. 7d is an enlarged exploded cross-sectional view illustrating the wear pattern along the piston ring in FIG. 7a caused by the fluid pressure forces induced by the inward and outward grooves along the mating rings onto the piston ring.

While the invention is described with particular reference to the intershaft seal assembly 30 shown in FIG. 6, it is understood that the invention is likewise applicable to other intershaft assemblies wherein a seal is provided between concentrically aligned and rotating inner and outer shafts 31, 32, including but not limited to the assembly described by Lipschitz in U.S. Pat. No. 4,972,986. The inner and outer shafts 31, 32 are not shown for the drawings discussed below.

Piston ring 35, forward and aft mating rings 33, 34, spacer ring 36, stop ring 54, and carrier 37 are composed of materials understood in the art.

The divergent flow grooves 47 described herein are manufactured via methods understood in the art.

Pressure diagrams are representative of gauge pressures. The symmetric pressure profiles described herein are exemplary of the cross-sectional shapes which could be communicated onto a piston ring 35. However, other symmetric cross sectional profiles are possible.

Referring now to FIGS. 11a-11c, the seal system 29 is shown including a piston ring 35 interposed between a forward mating ring 33 and an aft mating ring 34. A spacer ring 36 is arranged concentrically with the piston ring 35. The spacer ring 36 is wider than the piston ring 35 so as to contact the forward and aft mating rings 33, 34, thereby allowing the piston ring 35 to translate between the mating rings 33, 34. The forward and aft mating rings 33, 34 and spacer ring 36 contact a carrier 37 about an inner shaft 31, shown in FIG. 6, and are secured thereto via a stop ring 54 so as to be rotatable with the inner shaft 31. The forward and aft mating rings 33, 34 include grooves disposed along a surface immediately adjacent to the piston ring 35.

The piston ring 35 is dimensioned to have an inner diameter larger than the outer diameter of the spacer ring 36 so as to form an annular gap 40 therebetween. The piston ring 35 is also preferred to have an outer diameter which either avoids or limits contact with the inner diameter of the outer shaft 32 when the outer shaft 32 is at rest. The piston ring 35 also includes one or more design features known within the art, one example being the gap 56 shown in FIGS. 11f and 12f, which allow the piston ring 35 to flex or expand diametrically so as to contact the outer shaft 32 as the piston ring 35 and outer shaft 32 rotate. The contact forces between the piston ring 35 and outer shaft 32 should be sufficient so that the piston ring 35 moves with the outer shaft 32 while avoiding and/or minimizing friction-induced wear therebetween. Also, contact between the piston ring 35 and outer shaft 32 is preferred to restrict fluid from flowing directly from the high pressure region to the low pressure region.

A plurality of divergent flow grooves 47 could be provided along the face 41 of the aft mating ring 34 and another plurality of outward flow hydrodynamic grooves 43 could be provided along the face 42 of the forward mating ring 33. It is also understood that the forward face 42 could include other types of hydrodynamic grooves known within the art, including but not limited to inward flow grooves.

The divergent flow grooves 47 and outward flow hydrodynamic grooves 43 are located along the faces 41, 42, respectively, so as to overlay at least a portion of the radial width ($W_P$) of the piston ring 35, preferably overlaying the piston ring 35 during transient and steady-state operations of the turbine. This arrangement ensures that the grooves 43, 47 communicate a hydrodynamic force onto the piston ring 35 regardless of its position between the mating rings 33, 34 and/or inner and outer shafts 31, 32.

As shown in FIG. 6, the forward and aft mating rings 33, 34 each have an outer diameter less than the inner diameter of the outer shaft 32. The resultant spaces allow fluid to flow out of the high pressure region and into the low pressure region. In some embodiments, a plurality of ports 46 could be disposed through the forward mating ring 33 adjacent to the carrier 37, however positioned so as to communicate fluid to the annular gap 40 between the piston ring 35 and spacer ring 36, as represented in FIGS. 11a and 11c. The ports 46 could be cylindrical-shaped holes which extend from the high pressure region through to the annular gap 40. The ports 46 are disposed along the face 42 of the forward mating ring 33 at one or more radial distances from the centerline of the inner shaft 31. One or more ports 46 could be aligned immediately adjacent to each outward flow hydrodynamic groove 43.

Referring now to FIG. 11d, each divergent flow groove 47 could include a pair of grooves 27, 28 disposed along the face 41 of the aft mating ring 34. The grooves 27, 28 are aligned in an intersecting fashion so as to form an apex 48. The grooves 27, 28 could include linear and/or arcuate-shaped shallow depressions or slots. The grooves 27, 28 are preferred to be aligned symmetrically about the apex 48. The divergent flow grooves 47 are preferred to be aligned with the apexes 48 pointing toward the direction of rotation so that fluid entering each apex 48 is directed into the corresponding grooves 27, 28 resulting in the flows graphically represented in FIG. 11d. The dimensions, shape, and alignment of the apex 48 and grooves 27, 28 should ensure that fluid entering the apex 48 is separated into two flows. The flows should be at least substantially equal so as to communicate a substantially symmetric pressure profile about the axis of symmetry defined by the apex 48 and grooves 27, 28.

In some embodiments, divergent flow grooves 47 could be aligned about the aft mating ring 34 so that one or more apexes 48 are disposed between each pair of grooves 27, 28. For example, FIG. 11d shows divergent flow grooves 47 whereby one apex 48 from a neighboring divergent flow groove 47 resides between each paired arrangement of grooves 27, 28. In other embodiments, the divergent flow grooves 47 could be arranged end-to-end without overlap so that the apex 48 of each divergent flow groove 47 begins immediately or some distance from where the adjacent grooves 27, 28 end.

In order for the divergent flow grooves 47 to produce substantially symmetric pressures along at least a portion of the radial width ($W_P$) of the piston ring 35, fluid is communicated onto each divergent flow groove 47 so as to impinge at least a portion of the apex 48, thus allowing the resultant flow to be approximately equally divided between the grooves 27, 28.

Referring now to FIGS. 11e and 11f, the piston ring 35 could include a plurality of channels 53 which direct fluid from the annular gap 40 upward through the piston ring 35. In FIG. 11e, the piston ring 35 is shown as an L-shaped channel 53 with a circular cross section which forms a complete passage from the inner diameter face 52 to the aft face 49 with outlet 62. However, other channel 53 designs are possible. The channels 53 are manufactured via methods understood in the art.

The channels 53 are separately disposed about the piston ring 35 in a circumferential fashion, as represented in FIG. 11f, at a radius which ensures fluid exiting the channel 53 via the outlet 62 along the aft face 49 impinges the apexes 48 immediately adjacent thereto along the aft mating ring 34. In preferred embodiments, the centers of each outlet 62 and each apex 48 should be at about the same radial distance from the centerline of the inner shaft 31.

Referring again to FIG. 11f, one or more generally arcuate-shaped grooves 55 could be included along the aft face 49 of the piston ring 35. Each groove 55 could be a pocket recessed along the piston ring 35 about one or more outlets 62. The radial position of the grooves 55 could overlay the apexes 48 along the aft mating ring 34. The length of each groove 55 could be sufficient so as to overlap one or more apexes 48 as the piston ring 35 rotates with respect to the aft mating ring 34. This arrangement allows the fluid communicated through a channel 53 to exit the piston ring 35 into at least one groove 55 prior to communication onto one or more apexes 48 disposed along the aft mating ring 34.

In some embodiments, a face dam could be provided along the forward face of the piston ring 35. The face dam could include four or more intersecting grooves that extend to the inner diameter of the piston ring 35. This feature would allow the low pressure, associated with the through holes along the aft mating ring 34, to extend up the forward face of the piston ring 35 to reduce the axial closing force which causes the piston ring 35 to contact the aft mating ring 34. The resultant pressure profile would break down over a smaller area rather than over the entire width of the piston ring 35.

Referring now to FIG. 11g, an exemplary flow diagram is shown describing one possible steady-state flow pattern between the high and low pressure regions over the seal system 29 in FIG. 11a. In this embodiment, the fluid from the high pressure region passes over the forward mating ring 33 and through the forward mating ring 33 via the ports 46. The fluid passing over the forward mating ring 33 is directed downward, because of the contact between piston ring 35 and outer shaft 32, along the space between the forward mating ring 33 and piston ring 35 across the outward flow hydrodynamic grooves 43 so as to combine with the fluid exiting the ports 46. Thereafter, the fluid passes through the annular gap 40 adjacent to the spacer ring 36 with a portion of the fluid entering the channels 53 and another portion passing upward along the space between the piston ring 35 and aft mating ring 34 across the divergent flow grooves 47. The fluid passing through the channels 53 exits the piston ring 35 via the outlet 62 impinging the divergent flow grooves 47 as described herein. Thereafter, the fluid from the channels 53 and annular gap 40 flows over the aft mating ring 34 into the low pressure region.

Referring now to FIG. 11h, an exemplary pressure diagram is shown describing the steady-state pressures along the aft face 49, forward face 50, outer diameter face 51, and inner diameter face 52 of the piston ring 35 in FIG. 11a.

The inner diameter pressure profile 60 is produced by the fluid within the annular gap 40 and is generally uniform along the inner diameter face 52. The outer diameter pressure profile 59 could result from the outward centrifugal forces acting along the piston ring 35 as it presses against the outer shaft 32 and forces acting along the inner diameter face 52. The outer diameter pressure profile 59 is generally non-linear because of the flow pattern into the low pressure region immediately adjacent to the aft mating ring 34 near the outer diameter face 51. The resultant force balance fixes the piston ring 35 to the outer shaft 32 so that both rotate together without sliding.

The forward pressure profile 58 results primarily from the hydrodynamic forces imposed along the piston ring 35 immediately adjacent to the forward face 50 via the outward flow hydrodynamic grooves 43. The pressure profile is non-symmetric because pressure within a groove generally increases along the direction of flow.

The aft pressure profile 57 results primarily from the hydrodynamic forces imposed onto the aft face 49 of the piston ring 35 by the divergent flow grooves 47. The aft pressure profile 57 is substantially symmetric about the apexes 48 of the divergent flow grooves 47.

Any asymmetries along the aft pressure profile 57 are due in part to asymmetries along the grooves 27, 28 about the apex 48 or venting conditions along the aft face 49 adjacent to the outer and inner diameter faces 51, 52. The pressure generally increases with distance from the apex 48 because orientation of the divergent flow grooves 47 direct the flow pattern from the apex 48 towards the grooves 27, 28. The maximum pressure could occur near the ends of grooves 27, 28, or one or both ends of the piston ring 35, or near the outer diameter 63 of the aft mating ring 34. The pressure decay toward the top of the aft face 49 could result from flow conditions into the low pressure region near the outer diameter face 51. The pressure decay along the aft face 49 immediately adjacent to the annular gap 40 could result from flow into the channel 53 along the inner diameter face 52.

The resultant force balance acting along the opposed aft and forward faces 49, 50 allows the piston ring 35 to rotate without contacting the forward and aft mating rings 33, 34. In preferred embodiments, the force balance centers the piston ring 35 so as to be equidistant from the forward and aft mating rings 33, 34. Any excursions from the steady-state position of the piston ring 35 increase the interface pressure, thus restoring the piston ring 35 to its steady-state position within the seal system 29. The substantially symmetric aft pressure profile 57 minimizes pressure induced twist imparted by the non-symmetric forward pressure profile 58.

Referring now to FIGS. 12a-12d, the seal system 29 in FIG. 11a is now shown including a plurality of divergent flow grooves 47 disposed along the face 42 of the forward mating ring 33 and along the face 41 of the aft mating ring 34. The divergent flow grooves 47 are positioned along the aft and forward mating rings 33, 34 so as to overlay the piston ring 35. In preferred embodiments, the divergent flow grooves 47 along the forward and aft mating rings 33, 34 are disposed so that the apexes 48 are at the same radial distance from the centerline of the inner shaft 31. In other embodiments, the divergent flow grooves 47 could be provided along the forward mating ring 33 only and other hydrodynamic grooves along the aft mating ring 34.

The forward mating ring 33 could include a plurality of ports 46 disposed circumferentially about and through the forward mating ring 33. Ports 46 are positioned adjacent to the divergent flow grooves 47 so as to communicate fluid from the high pressure region onto the apexes 48, as represented in FIG. 12a. In some embodiments, one or more ports 46 could be positioned forward of each apex 48 so that the fluid exiting the ports 46 passes into the divergent flow grooves 47 via the relative rotation between the forward mating ring 33 and piston ring 35. In preferred embodiments, at least one port 46 could be positioned within the apex 48 so as to directly communicate fluid from the high pressure region into the divergent flow groove 47 which is then separated into two flows along the grooves 27, 28, as represented in FIGS. 12c and 12d. The divergent flow grooves 47 disposed along the face 41 of the aft mating ring 34 are as shown in FIG. 11d.

The aft mating ring 34 could include a plurality of ports 61 disposed circumferentially about and through the aft mating ring 34. The ports 61 could be positioned along the aft mating ring 34 between the piston ring 35 and spacer ring 36 so as to vent fluid from the annular gap 40 into the low pressure region.

Referring now to FIGS. 12e and 12f, the piston ring 35 is shown including a channel 53 which directs fluid along the outer diameter face 51 downward and out from an outlet 62 along the aft face 49. The channel 53 is shown as an L-shaped structure; however, other designs are possible. The piston ring 35 could include one or more circumferential grooves 19 along the corner between the forward face 50 and the outer diameter face 51 so as to improve flow into the channels 35. The grooves 19 could partially traverse the thickness of the piston ring 35 so as to maintain a dam 65 along the outer diameter face 51 adjacent to the lower pressure region. The dam 65 could restrict flow over the piston ring 35 adjacent to an outer shaft. In some embodiments, the grooves 19 could be circumferentially disposed along the central region of the outer diameter surface of the piston ring 35 and include a plurality of feed slots from a face along the piston ring 35 which intersect the groove 19 so as to allow fluid to enter the groove 19. The outlet 62 for each channel 53 is positioned along the aft face 49 so as to communicate fluid onto the apex 48 of each divergent flow groove 47 along the face 41. One or more outlets 62 could be positioned along one or more arcuate-shaped grooves 55 along the piston ring 35 so as to focus and/or direct flow from the channels 53 onto one or more apexes 48 as the aft mating ring 34 rotates relative to the piston ring 35.

Referring now to FIG. 12g, an exemplary flow diagram is shown describing one possible steady-state flow pattern between the high and low pressure regions over the seal system 29 in FIG. 12a.

In this embodiment, the fluid from the high pressure region passes over the forward mating ring 33 and into the grooves 19 at the top of the piston ring 35. Thereafter, the fluid traverses the channels 53 so as to exit the outlets 62 immediately adjacent to the divergent flow grooves 47 along the aft mating ring 34. The fluid then enters the divergent flow grooves 47 via the apexes 48 and is separated into the grooves 27, 28. The divergent flow grooves 47 then communicate a substantially symmetric pressure force onto the aft face 49 of the piston ring 35.

Fluid from the high pressure region also passes through the ports 46 and into the space between the forward mating ring 33 and piston ring 35. The fluid then passes onto apexes 48 of the divergent flow grooves 47 along the forward mating ring 33 where it is separated into the grooves 27, 28. Thereafter, the fluid is communicated onto the forward face 50 of the piston ring 35 as a substantially symmetric pressure force.

A portion of the fluid which passes downward between the forward mating ring 33 and piston ring 35 enters the annular gap 40 between the piston ring 35 and spacer ring 36 and combines with a portion of the fluid passing downward between the aft mating ring 34 and piston ring 35 before entering the low pressure region via the ports 61. A portion of the fluid which passes upward between the forward mating ring 33 and piston ring 35 combines with fluid passing over the forward mating ring 33 and enters the channels 53. A portion of the fluid which passes upward between the aft mating ring 34 and the piston ring 35 passes over the aft mating ring 34 into the low pressure region.

Referring now to FIG. 12h, an exemplary pressure diagram is shown describing the steady-state pressures along the aft face 49, forward face 50, outer diameter face 51, and inner diameter face 52 of the piston ring 35 in FIG. 12a.

The pressure along the inner diameter face 52 is produced primarily by the fluid within the annular gap 40 and generally negligible as it is vented into the low pressure region via the ports 61. The outer diameter pressure profile 59 could result from the outward centrifugal forces acting along the piston ring 35 as it presses against the outer shaft 32, pressure force acting along the inner diameter face 52, and pressure forces acting along the outer diameter face 51 within the groove 19. The outer diameter pressure profile 59 is generally uniform with a gradual decay toward the aft face 49. This decay is attributed to flow into the low pressure region immediately adjacent to the aft mating ring 34 near the outer diameter face 51. The resultant force balance fixes the piston ring 35 to the outer shaft 32 so that both rotate without sliding.

The forward pressure profile 58 results primarily from the hydrodynamic forces imposed onto the forward face 50 of the piston ring 35 by the divergent flow grooves 47. The forward pressure profile 58 is substantially symmetric about the apexes 48 of the divergent flow grooves 47. Flow from the high pressure region results in a more uniform pressure profile adjacent to the grooves 19.

The aft pressure profile 57 results primarily from the hydrodynamic forces imposed onto the aft face 49 of the piston ring 35 by the divergent flow grooves 47. The aft pressure profile 57 is substantially symmetric about the apexes 48 of the divergent flow grooves 47.

Any asymmetries along the aft and forward pressure profiles 57, 58 are due in part to asymmetries along the grooves 27, 28 about the apex 48 or venting conditions adjacent to the outer and inner diameter faces 51, 52. The pressure generally increases with distance from the apexes 48 because orientation of the divergent flow grooves 47 biases the flow pattern from the apexes 48 towards the grooves 27, 28. The maximum pressure along the aft and forward pressure profiles 57, 58 could occur near the ends of the grooves 27, 28, or one or both ends of the piston ring 35, or near the outer diameter 63 of the aft mating ring 34. The pressure decay beyond the maximums could result from venting conditions adjacent to the annular gap 40 and the aft face 49 near the outer diameter face 51.

The resultant force balance acting along the opposed aft and forward faces 49, 50 allows the piston ring 35 to rotate without contacting the forward and aft mating rings 33, 34. In preferred embodiments, the force balance centers the piston ring 35 so as to be equidistant from the forward and aft mating rings 33, 34. Any excursions from the steady-state position of the piston ring 35 increase the interface pressure, thus restoring the piston ring 35 to its steady-state position within the seal system 29. The substantially symmetric aft and forward pressure profiles 57, 58 minimize pressure induced twisting along the piston ring 35.

Referring now to FIGS. 12i and 12j, the piston ring 35 shown in FIGS. 12a-12h now includes a plurality of channels 53 horizontally disposed so as to traverse the thickness of the piston ring 35. In this embodiment, the channels 53 are shown as linear structures; however, other designs are possible. The channels 53 are positioned along the piston ring 35 so as to at least partially align with the ports 46 along the forward mating ring 33 and the apexes 48 of the divergent flow grooves 47 along the forward and aft mating rings 33, 34. This arrangement allows the channels 53 to direct fluid from the high pressure region directly onto the divergent flow grooves 47 along the aft mating ring 34. The piston ring 35 could include one or more circumferential grooves 19 as described. The grooves 19 could partially traverse the thickness of the piston ring 35 so as to form a dam 65 along the outer diameter face 51 adjacent to the high pressure region. This arrangement restricts flow from passing over the piston ring 35 adjacent to an outer shaft and reduces the total magnitude of the outer diameter pressure profile 59.

Referring again to FIG. 12i, an exemplary flow diagram is shown describing one possible steady-state flow pattern between the high and low pressure regions about the piston ring 35 with forward facing dam 65.

In this embodiment, fluid from the high pressure region passes over the forward mating ring 33 and is directed between the piston ring 35 and forward mating ring 33 via the dam 65. Fluid also traverses the ports 46 along the forward mating ring 33 and enters the space between the piston ring 35 and forward mating ring 33. The fluid is communicated onto the divergent flow grooves 47 where it is separated into the grooves 27, 28 which then communicate a substantially symmetric pressure force onto the forward face 50 of the piston ring 35.

A portion of the fluid from the high pressure region then passes through the channels 53 and into the space between the aft mating ring 34 and piston ring 35. This fluid enters the apexes 48 of the divergent flow grooves 47 along the aft mating ring 34 where it is separated into the grooves 27, 28. Thereafter, the fluid is communicated onto the aft face 49 of the piston ring 35 as a substantially symmetric pressure force.

Another portion of the fluid passes through the annular gap 40 between the piston ring 35 and the spacer ring 36. This fluid then mixes with a portion of the fluid from the channels 53 and is then vented into the low pressure regions via the ports 61. The remaining portion of the fluid from the channels 53 passes over the aft mating ring 34 and into the low pressure region.

Referring again to FIG. 12j, an exemplary pressure diagram is shown describing the steady-state pressures along the aft face 49, forward face 50, outer diameter face 51, and inner diameter face 52 of the piston ring 35 with forward facing dam 65.

The pressure along the inner diameter face 52 is produced primarily by fluid within the annular gap 40 and generally negligible as it is vented into the low pressure region via the ports 61. The outer diameter pressure profile 59 could result from the outward centrifugal forces acting along the piston ring 35 as it presses against the outer shaft 32, pressure forces acting along the inner diameter face 52, and pressure induced forces acting along the outer diameter face 51. The outer diameter pressure profile 59 is generally non-uniform with a rapid decay toward the aft face 49. The magnitude of the outer diameter pressure profile 59 and its decay result primarily from the centrifugal forces which are influenced by the thickness of the dam 65. The dam 65 prevents fluid from contacting the outer diameter face 51, thus avoiding fluid induced pressure forces along the outer diameter face 51. The resultant force balance fixes the piston ring 35 to the outer shaft 32 so that both rotate without sliding.

The forward pressure profile 58 results primarily from the hydrodynamic forces imposed onto the forward face 50 of the piston ring 35 by the divergent flow grooves 47. The forward pressure profile 58 is substantially symmetric about the apexes 48 of the divergent flow grooves 47. Flow from the high pressure region onto the forward mating ring 33 results in a uniform pressure profile adjacent to the dam 65.

The aft pressure profile 57 results primarily from the hydrodynamic forces imposed onto the aft face 49 of the piston ring 35 by the divergent flow grooves 47. The aft pressure profile 57 is substantially symmetric about the apexes 48 of the divergent flow grooves 47.

Any asymmetries along the aft and forward pressure profiles 57, 58 are due in part to asymmetries along the grooves 27, 28 about the apex 48 or venting conditions adjacent to the outer and inner diameter faces 51, 52. The pressure generally increases with distance from the apexes 48 because orientation of the divergent flow grooves 47 biases the flow pattern from the apexes 48 towards the grooves 27, 28. The maximum pressure along the aft and forward pressure profiles 57, 58 could occur near the ends of the grooves 27, 28, or one or both ends of the piston ring 35, or near the outer diameter 63 of the aft mating ring 34. The pressure decay beyond the maximums could result from venting conditions adjacent to the annular gap 40 and the aft face 49 near the outer diameter face 51.

The resultant force balance acting along the opposed aft and forward faces 49, 50 allows the piston ring 35 to rotate without contacting the forward and aft mating rings 33, 34. In preferred embodiments, the force balance centers the piston ring 35 so as to be equidistant from the forward and aft mating rings 33, 34. Any excursions from the steady-state position of the piston ring 35 increase the interface pressure, thus restoring the piston ring 35 to its steady-state position within the seal system 29. The substantially symmetric aft and forward pressure profiles 57, 58 minimize pressure induced twisting along the piston ring 35.

Referring now to FIGS. 11i and 11j, the dam 65 from in FIG. 12i is likewise applicable to the piston ring 35 shown in FIGS. 11a-11h. In this embodiment, the piston ring 35 could include one or more circumferential grooves 19 as described herein. The grooves 19 could partially traverse the thickness of the piston ring 35 so as to form a dam 65 along the outer diameter face 51 adjacent to the high pressure region. This arrangement could restrict flow over the piston ring 35 adjacent to an outer shaft and reduce the total magnitude of the outer diameter pressure profile 59.

The outer diameter pressure profile 59 could result from the outward centrifugal forces acting along the piston ring 35 as it presses against the outer shaft 32, pressure forces acting along the inner diameter face 52, and pressure induced forces acting along the outer diameter face 51. The outer diameter pressure profile 59 is generally non-uniform with a rapid decay toward the aft face 49. The magnitude of the outer diameter pressure profile 59 and its decay result primarily from the centrifugal forces which are influenced by the thickness of the dam 65. The dam 65 prevents fluid from contacting the outer diameter face 51, thus avoiding fluid induced pressure forces along the outer diameter face 51. The resultant force balance fixes the piston ring 35 to the outer shaft 32 so that both rotate without sliding. Pressure forces along the forward and aft faces 50, 49 are substantially as described in FIG. 11h.

Referring now to FIGS. 13a-13d, the seal system 29 in FIG. 11a is now shown including a piston ring 35 with a plurality of downward flow channels 53 interposed between a forward mating ring 33 with outward flow hydrodynamic grooves 43 and an aft mating ring 34 with divergent flow grooves 47.

The piston ring 35 is shown including a channel 53 which directs fluid along the outer diameter face 51 downward and out from an outlet 62 along the aft face 49. The channel 53 is shown as an L-shaped structure; however other designs are possible. The piston ring 35 could include one or more circumferential grooves 19 along the corner between the forward face 50 and the outer diameter face 51 forming a dam 65 adjacent to the low pressure region, as otherwise described herein, so as to improve flow into the channels 35, as represented in FIGS. 13d and 12f. The outlet 62 is positioned along the aft face 49 so as to communicate fluid onto the apex 48 of each divergent flow groove 47 along the face 41. One or more outlets 62 could be positioned along one or more arcuate-shaped grooves 55 along the piston ring 35 so as to focus and/or direct flow from the channels 53 onto one or more apexes 48 as the aft mating ring 34 rotated relative to the piston ring 35.

The aft mating ring 34 could include a plurality of ports 61 disposed circumferentially about and through the aft mating ring 34. The ports 61 could be positioned along the aft mating ring 34 between the piston ring 35 and spacer ring 36 so as to vent fluid from the annular gap 40 into the low pressure region.

Referring now to FIG. 13d, an exemplary flow diagram is shown describing one possible steady-state flow pattern between the high and low pressure regions over the seal system 29 in FIG. 13a.

In this embodiment, the fluid from the high pressure region passes over the forward mating ring 33 and into the grooves 19 at the top of the piston ring 35. Thereafter, the fluid traverses the channels 53 so as to exit the outlets 62 immediately adjacent to the divergent flow grooves 47 along the face 41 of the aft mating ring 34. The fluid then enters the divergent flow grooves 47 via the apexes 48 and is separated into the grooves 27, 28 described herein. The divergent flow grooves 47 then communicate a substantially symmetric pressure force onto the aft face 49 of the piston ring 35.

Fluid from the high pressure region also passes down between the space between the forward mating ring 33 and piston ring 35 and over the outward flow hydrodynamic grooves 43. Thereafter, the fluid enters the annular gap 40 between the piston ring 35 and spacer ring 36.

A portion of the fluid which passes downward between the aft mating ring 34 and the piston ring 35 enters the annular gap 40 and combines with the fluid which passes downward between the forward mating ring 33 and piston ring 35 before entering the low pressure region via the ports 61. A portion of the fluid which passes upward between the aft mating ring 34 and the piston ring 35 passes over the aft mating ring 34 into the low pressure region.

Referring now to FIG. 13e, an exemplary pressure diagram is shown describing the steady-state pressures along the aft face 49, forward face 50, outer diameter face 51, and inner diameter face 52 of the piston ring 35 in FIG. 13a.

The pressure along the inner diameter face 52 is produced primarily by the fluid within the annular gap 40 and generally negligible as it is quickly vented into the low pressure region via the ports 61. The outer diameter pressure profile 59 could result from the outward centrifugal forces acting along the piston ring 35 as it presses against the outer shaft 32, pressure force acting along the inner diameter face 52, and pressure forces acting along the outer diameter face 51 within the groove 19. The outer diameter pressure profile 59 is generally uniform with a gradual decay toward the aft face 49. This decay is attributed to flow into the low pressure region immediately adjacent to the aft mating ring 34 near the outer diameter face 51. The resultant force balance fixes the piston ring 35 to the outer shaft 32 so that both rotate without sliding.

The forward pressure profile 58 results primarily from the hydrodynamic forces imposed along the piston ring 35 immediately adjacent to the forward face 50 via the outward flow hydrodynamic grooves 43. The profile is generally triangular-shaped and non-symmetric because pressures within a groove generally increase along the direction of flow.

The aft pressure profile 57 results primarily from the hydrodynamic forces imposed onto the aft face 49 of the piston ring 35 by the divergent flow grooves 47. The aft pressure profile 57 is substantially symmetric about the apexes 48 of the divergent flow grooves 47.

Any asymmetries along the aft and forward pressure profiles 57, 58 are due in part to asymmetries along the grooves 27, 28 about the apex 48 or venting conditions adjacent to the outer and inner diameter faces 51, 52. The pressure generally increases away from the apexes 48 because orientation of the divergent flow grooves 47 biases flow from the apexes 48 towards the grooves 27, 28. The maximum pressure along the aft and forward pressure profiles 57, 58 could occur near the ends of the grooves 27, 28, or one or both ends of the piston ring 35, or near the outer diameter 63 of the aft mating ring 34. The pressure decay beyond the maximums could result from venting conditions adjacent to the annular gap 40 and the outer diameter face 51 at the aft face 49.

The resultant force balance acting along the opposed aft and forward faces 49, 50 allows the piston ring 35 to rotate without contacting the forward and aft mating rings 33, 34. In preferred embodiments, the force balance centers the piston ring 35 so as to be equidistant from the forward and aft mating rings 33, 34. Any excursions from the steady-state position of the piston ring 35 cause an increase in the interface pressure, thus restoring the piston ring 35 to its steady-state position within the seal system 29. The substantially symmetric aft pressure profile 57 minimizes pressure induced twisting imposed by the forward mating ring 33.

The divergent flow grooves 47 and outward flow hydrodynamic grooves 43 described herein are understood to include depressions, recesses, or slots disposed along the surface of the forward and aft mating rings 33, 34. In some embodiments, the depth and width of the divergent flow grooves 47 and outward flow hydrodynamic grooves 43 are uniform or constant.

Referring now to FIGS. 14a and 14b, the divergent flow grooves 47 could include variable depths and widths. For example, the divergent flow groove 47 in FIG. 14a is shown including grooves 27, 28 each with an inwardly tapered profile ($W_1$ to $W_2$) from the apex 48 to the end of each groove 27, 28. In another example, the divergent flow groove 47 in FIG. 14b is shown with a depth profile ($D_1$ to $D_2$) that decreases with distance from the apex 48.

Referring now to FIGS. 15a and 15b, the hydrodynamic grooves described herein, as well as other grooves capable of imparting a non-symmetric pressure profile onto a piston ring 35, could also include variable depths and widths. For example, the hydrodynamic groove 64 in FIG. 15a is shown with a tapered profile from $W_1$ to $W_2$ against the direction of rotation. In another example, the hydrodynamic groove 64 in FIG. 15b is shown with a depth profile that decreases from $D_1$ to $D_2$ against the direction of rotation.

The description above indicates that a great degree of flexibility is offered in terms of the present invention. Although various embodiments have been described in considerable detail with reference to certain preferred versions thereof, other versions are possible. Therefore, the spirit and scope of the appended claims should not be limited to the description of the preferred versions contained herein.

What is claimed is:

1. A method for minimizing twist within an intershaft seal system disposed between an inner shaft and an outer shaft comprising the steps of:
   (a) communicating a fluid from a high pressure region to a low pressure region separated by a piston ring disposed between a forward mating ring and an aft mating ring, said piston ring includes a plurality of substantially vertical channels, each said substantially vertical channel directly communicates at one end with an outer diameter face when said outer diameter face includes at least one outer groove directly contacting a dam or an inner diameter face along said piston ring when said forward mating ring includes at least one port which communicates said fluid to said inner diameter face and directly communicates at another end with a substantially horizontal channel;
   (b) directing said fluid onto a plurality of divergent flow grooves disposed along said aft mating ring, each said divergent flow groove includes a pair of grooves which intersect at an apex, each said substantially horizontally channel also communicates with at least one said apex, said fluid enters each said substantially vertical channel and passes into said substantially horizontal channel exiting onto said apex as said piston ring rotates with respect to said divergent flow grooves, said pair of grooves being substantially symmetric about said apex, said fluid impinges said apexes so that said fluid flows into said pairs of grooves, said forward mating ring includes a plurality of hydrodynamic grooves; and
   (c) producing a first fluid pressure force along said piston ring via said divergent flow grooves, said first fluid pressure force being substantially symmetric across a radial width of said piston ring with respect to said apexes.

2. The method of claim 1, wherein said fluid enters said substantially vertical channel adjacent to said outer diameter surface.

3. The method of claim 1, wherein said fluid enters said substantially vertical channel adjacent to said inner diameter surface.

4. The method of claim 1, further comprising the step of:
   (d) producing a non-symmetric second fluid pressure force along said piston ring opposite of said first fluid pressure force via said hydrodynamic grooves.

5. The method of claim 1, further comprising the step of:
   (d) producing a symmetric second fluid pressure force along said piston ring opposite of said first fluid pressure force via said hydrodynamic grooves.

6. An intershaft seal system disposed between an outer shaft and an inner shaft which are concentric and separately rotatable comprising:
   (a) a forward mating ring adjacent to a high pressure region; and
   (b) an aft mating ring adjacent to a low pressure region, whereby
      said forward mating ring and said aft mating ring separately disposed about and separately rotatable from a piston ring,
      said aft mating ring having a plurality of divergent flow grooves thereon, each said divergent flow groove includes a pair of grooves which intersect at an apex, said pair of grooves being substantially symmetric about said apex,
      said forward mating ring includes a plurality of hydrodynamic grooves,
      said piston ring includes a plurality of substantially vertical channels, each said substantially vertical channel directly communicates at one end with an outer diameter face when said outer diameter face includes at least one outer groove directly contacting a dam or an inner diameter face along said piston ring when said forward mating ring includes at least one port which communicates a fluid to said inner diameter face and directly communicates at another end with a substantially horizontal channel, each said substantially horizontal channel also communicates with one said apex, said fluid from said high pressure region directed through each said substantially vertical channel into said substantially horizontal channel and then onto said apex as said piston ring rotates with respect to said divergent flow grooves, said apex directs said fluid into said pair of grooves, said divergent flow grooves produce a substantially symmetric fluid pressure along a face of said piston ring so as to minimize twist along said piston ring.

7. The intershaft seal system of claim 6, wherein said substantially vertical channels extend from said outer diameter face inward toward said inner shaft.

8. The intershaft seal system of claim 6, wherein said substantially vertical channels extend from said inner diameter face outward toward said outer shaft.

9. The intershaft seal system of claim 6, wherein a depth or a width varies along at least one said hydrodynamic groove.

10. The intershaft seal system of claim 6, wherein said hydrodynamic grooves are said divergent flow grooves and a plurality of holes through said forward mating ring communicate said fluid from said high pressure region onto said divergent flow grooves along said forward mating ring.

11. The intershaft seal system of claim 6, wherein a depth or a width varies along at least one divergent flow groove.

12. The intershaft seal system of claim 6, wherein said piston ring includes at least one groove which directly communicates with at least one said substantially horizontal groove.

13. The intershaft seal system of claim 6, wherein said aft mating ring includes a plurality of holes which allow said fluid to enter said low pressure region.

14. The intershaft seal system of claim 6, wherein said dam prevents flow of said fluid between said piston ring and said outer shaft.

15. The intershaft seal system of claim 6, wherein said outer groove directly communicates with said substantially vertical channel.

\* \* \* \* \*